US012215539B1

(12) United States Patent
Earnest

(10) Patent No.: US 12,215,539 B1
(45) Date of Patent: Feb. 4, 2025

(54) PAN GARAGE DOOR SECTION HAVING LOW-PROFILE STILE AND HINGE AND METHODS OF MANUFACTURE AND USE

(71) Applicant: GRIDZ LLC, Knoxville, TN (US)

(72) Inventor: William Keith Earnest, Louisville, TN (US)

(73) Assignee: GRIDZ LLC, Knoxville, TN (US)

( * ) Notice: Subject to any disclaimer, the term of this patent is extended or adjusted under 35 U.S.C. 154(b) by 0 days.

(21) Appl. No.: 18/734,737

(22) Filed: Jun. 5, 2024

(51) Int. Cl.
*E06B 3/48* (2006.01)

(52) U.S. Cl.
CPC ......... *E06B 3/485* (2013.01); *E05Y 2900/106* (2013.01)

(58) Field of Classification Search
CPC ........ E06B 3/485; E06B 3/488; E06B 15/242; E06B 15/165; E06B 15/24; E05Y 2900/106
See application file for complete search history.

(56) References Cited

U.S. PATENT DOCUMENTS 3,740,916 A * 6/1973 Kenaga ..................... E04C 2/08 52/798.1
5,002,114 A 3/1991 Hormann
5,626,176 A 5/1997 Lewis, Jr. et al.
5,927,369 A 7/1999 Pedersen
6,006,817 A * 12/1999 Stone ...................... E06B 3/485 160/229.1
6,381,917 B1 5/2002 Thielow et al.
6,578,619 B2 6/2003 Wright
6,629,387 B2 * 10/2003 Whitley .................. E06B 3/485 52/64
6,883,578 B2 4/2005 Whitley
6,955,206 B2 10/2005 Mullet et al.
7,121,317 B2 10/2006 Mullet
7,201,207 B2 4/2007 Colston et al.
7,730,928 B2 6/2010 Stone et al.
(Continued)

FOREIGN PATENT DOCUMENTS

WO 0133023 A1 5/2001
WO 03029593 A1 4/2003

OTHER PUBLICATIONS

Wayne Dalton Models 9100/9605 brochure downloaded from https://www.wayne-dalton.com/garage-doors/detail/classic-steel-garage-doors-9100-9605 on Jun. 5, 2024.

*Primary Examiner* — Abe Massad
(74) *Attorney, Agent, or Firm* — Master Key IP, LLP; Jeromye V. Sartain

(57) ABSTRACT

A pan overhead garage door section having end stiles installed at each end of the door section face and at least one center stile installed at an intermediate location along the door section face, each such stile spanning between the opposite top and bottom rails and having a respective end and center stile face that is offset from and parallel to the door section face and is offset from the plane of the top and bottom rail legs toward the door section face entirely between the opposite top and bottom rails, wherein the perpendicular distance between the door section face and the offset end and center stile faces defines a reduced door section depth between the opposite top and bottom rails, thereby allowing for nested stacking of two pan overhead garage door sections together and accessible storage of door hardware between such nested pan overhead garage door sections.

28 Claims, 12 Drawing Sheets

(56) References Cited

U.S. PATENT DOCUMENTS

| | | | | |
|---|---|---|---|---|
| 8,376,021 | B2 * | 2/2013 | Hormann | E06B 3/485 160/232 |
| 2004/0103997 | A1 * | 6/2004 | Mullet | E05D 15/242 160/201 |
| 2005/0183834 | A1 | 8/2005 | Smallwood et al. | |
| 2007/0056694 | A1 | 3/2007 | Mullet | |
| 2024/0218729 | A1 * | 7/2024 | Kornish | E06B 3/76 |

* cited by examiner

PAN GARAGE DOOR SECTION HAVING LOW-PROFILE STILE AND HINGE AND METHODS OF MANUFACTURE AND USE

BACKGROUND

The subject of this patent application relates generally to overhead garage doors, and more particularly to pan garage door sections having a low-profile stile and optional hinge for improved storage, shipping, and handling.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, overhead garage doors are widely known and used as having parallel horizontal sections that are interconnected by hinges and each have opposite rollers that operate in corresponding tracks mounted at the left and right sides of the garage structure adjacent the opening, each such track having a vertical portion that is substantially parallel to the front of the garage or building and a horizontal portion that is parallel to the floor and/or roof or ceiling of the garage or building with a curved portion of track therebetween, whereby the garage door can be operated whether manually or via a garage door motor assembly so as to shift between a substantially vertical closed position and a substantially horizontal open position. The typical sizes of such garage openings and thus such overhead garage doors are either eight feet (8 ft.) (single-car) or sixteen feet (16 ft.) (two-car) in width and approximately seven feet (7 ft.) in height made up of either three horizontal hinged door sections of approximately twenty-eight inches (28 in.) in height each or four horizontal hinged door sections of approximately twenty-one inches (21 in.) in height each, the latter currently being the most common. The related opening in which the garage door is installed is sized accordingly, the door frame generally comprising opposite vertical jambs and a horizontal header along with any related framing substructure or casing.

The individual sections of such an overhead garage door while originally constructed of wood are now predominantly formed of steel or aluminum. Early versions of such metal door sections involved sheet metal faces affixed on lengthwise rails. In current practice, sheet metal such as sheet steel is rolled and cut to width and length to form each individual door section, including forming the top and bottom longitudinal rails integrally with the face to provide strength and stiffness to the door section and stamping or embossing shapes in the face for aesthetic purposes. What is commonly referred to as a "pan door" is an overhead garage door made up of individual steel door sections having a single layer of sheet steel defining the face with integral rails. If the door section comprises only the sheet metal face and rails, which is most common, then it is effectively "non-insulated," while such pan doors may also be "insulated" as by being further formed having a relatively thin interior layer of foam such as polystyrene or polyurethane that is glued or formed in place on or otherwise affixed to the back side of the section face between the rails for added strength as well as thermal insulation. Whereas in a "sandwich" type door, each door section is formed having an outer sheet metal front face, a layer of insulation on the back of the front face that is substantially the full thickness of the door section to the rails and stiles, and an inner second layer of sheet metal or other material opposite the outer face and thus enclosing or "sandwiching" the insulation layer, such three-layer door having even further strength but also added cost and weight due to effectively doubling the amount of steel or the like in each door section.

The overall front-to-back thickness or depth of the typical pan overhead garage door is nominally two inches (2 in.) with the integral face and rails of each section formed from 26-gauge sheet steel having a thickness of approximately 0.018 inches (0.018 in.), which thickness is typically necessary for a double-car or sixteen- to eighteen-foot-wide door to successfully pass each manufacturer's individually defined life cycle testing, such as for example 10,000 to 50,000 operational cycles. To help further stiffen and strengthen each door section, end stiles at each vertical edge of the door section as well as at least one intermediate or center stile along the length of the door section are added so as to span between and fasten to the opposite top and bottom rails of each door section. The typical stile is of a "box design" meaning that it is formed having at least one side that is perpendicular to the face of the door and a stile face perpendicular to the stile side(s) that is thus parallel with and offset from the door face and extends at its top and bottom so as to overlap and allow for fastening to the respective top and bottom rails. As such, the typical end and center stiles are the full depth of the door section along with the rails so as to "box in" the back of the door section again for increased strength and stiffness, which rails and stiles also provide suitable structure for installation of the hinges used for joining adjacent sections. For even further strength and stiffness of the finished door, a lengthwise strut may be installed along one or more door section, also thus installed on the adjacent rail often at the locations where the stiles are fastened to the rail.

The problem is that such a conventional pan garage door section thus has a depth or thickness along its entire height or from top to bottom between the rails that is substantially the same as the depth or thickness of the integral sheet metal section itself as formed defining the face and opposite rails. Therefore, when such conventional door sections are stacked together unassembled for storage and transport, even without any hinges or struts pre-installed, the sections can only abut each other and not at all nest within each other particularly due to the full-profile or full-depth stiles, so that the space required to house the door sections is or remains the sum of the dimensions or thicknesses of the individual sections and no less. And again, disadvantageously, this is the case even without pre-installing the hinges on the door section since that would make stacking the sections together pre-assembly even less efficient, though of course installing the hinges completely in the field rather than at least partially at the factory is also less efficient. Moreover, any related door hardware that is to accompany the door sections in storage and/or for transport to a job site for assembly and installation, such as struts, drive tubes, door tracks, trim pieces, hinges, rollers, brackets, screws and other fasteners, etc. either cannot be inserted or removed from between the door sections after they are stacked together or if such hardware is as long or longer than the door sections are wide, or more particularly the space between stiles, which is the case with many such elongate hardware components such as struts and drive tubes, then such hardware simply cannot be contained between the stacked conventional door sections at all, leading to further inefficiencies in storage and in shipping and handling in terms of the space occupied outside of the stacked sections and the space wasted within the stacked sections. A related consideration in such unassembled door section and hardware packaging is having all components needed for a single door assembly and installation packaged together to prevent loss or separation in storage and transit or basically components missing at the job site. Thus, if all components can be packaged together and such packaging be relatively smaller or more compact, further advantages would be realized again both in storage and in shipping and handling.

One exemplary attempt at solving for the inefficiencies of stacking unassembled pan garage door sections for storage and transport along with related door hardware is shown in U.S. Pat. No. 7,121,317 to Mullet and assigned to Wayne-Dalton Corp., which is entitled "Sectional Door System" and discloses a sectional door including a plurality of panels pivotally joined to each other, the panels including a facer having a front surface, a first joint member and a second joint member extending rearwardly of the facer, a pair of end stiles received at lateral extremities of the panels and placed in supporting relation thereto, the stiles having a recess adjacent one of the joint member, a hinge receiver located adjacent the recess, and a hinge pivotally coupled to one of the panels at the hinge receiver and fastened to another of the panels at the end stile, wherein the recess provides a clearance for pivoting movement of the hinge and the storage or stowage of door components. Such notching or recessing a small portion of the stiles adjacent to the embedded or flush-mounted hinges does allow for storage of even elongate door hardware components between stacked door sections, though in a limited fashion and with limited accessibility to such hardware once the sections are stacked, but fundamentally such door sections even with recessed or notched stiles still cannot be nested in any way when stacked, such that the resulting thickness of two abutting stacked sections is double the thickness of each section just as with conventional pan door sections, thus making no gains in terms of the space occupied by such stacked door sections in storage and transport, and that while still not allowing for any pre-assembly of the hinges on the sections without adversely affecting stacking of the door sections or storage of door hardware in the stile recesses.

What has been needed and heretofore unavailable is a new and improved pan garage door section configuration with related low-profile stile and hinge and method of its manufacture and use offering reduced section stack height or thickness even with the hinges pre-installed as well as improved door hardware storage and accessibility between the stacked sections over currently available configurations. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and novel pan garage door section having a low-profile stile and optional hinge and related methods of manufacture and use. In at least one embodiment, the pan overhead garage door section comprises an end stile installed at each end of the door section face spanning between the opposite top and bottom rails, the end stile comprising an end stile face that is offset from and parallel to the door section face and is offset from the plane of the top and bottom rail legs toward the door section face entirely between the opposite top and bottom rails, and a center stile installed at an intermediate location along the door section face spanning between the opposite top and bottom rails, the center stile comprising a center stile face that is offset from and parallel to the door section face and is offset from the plane of the top and bottom rail legs toward the door section face entirely between the opposite top and bottom rails, wherein the perpendicular distance between the door section face and the offset end and center stile faces defines a reduced door section depth between the opposite top and bottom rails, the reduced door section depth being less than the nominal door section depth and defining a door section low-profile between the opposite top and bottom rails that is smaller than the door section full-profile, thereby allowing for nested stacking of two pan overhead garage door sections together and accessible storage of door hardware between such nested pan overhead garage door sections.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1A:
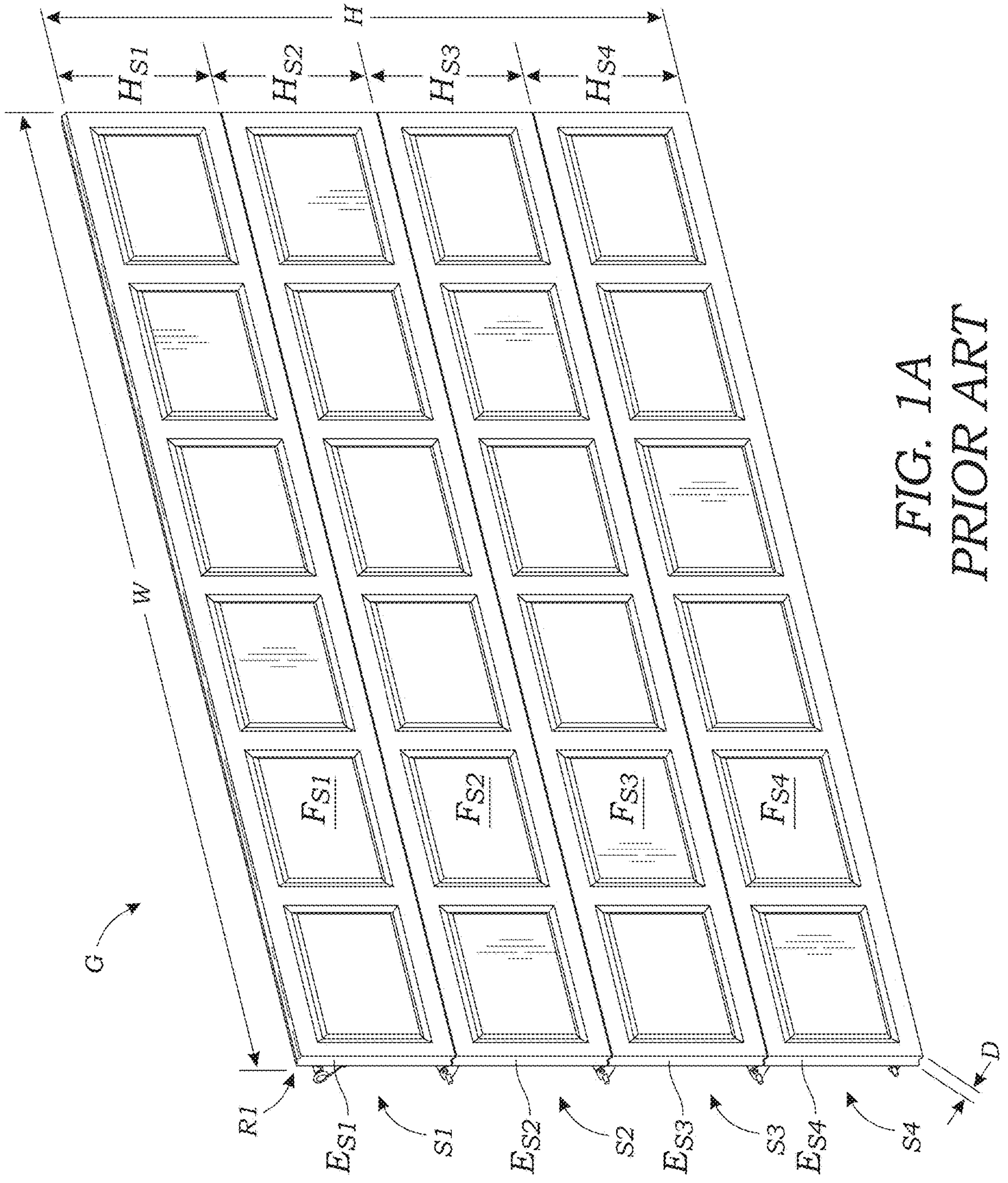
FIG. 1A PRIOR ART
FIG. 1A is a front perspective view of an exemplary prior art overhead garage door having four sections.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Figure 1B:
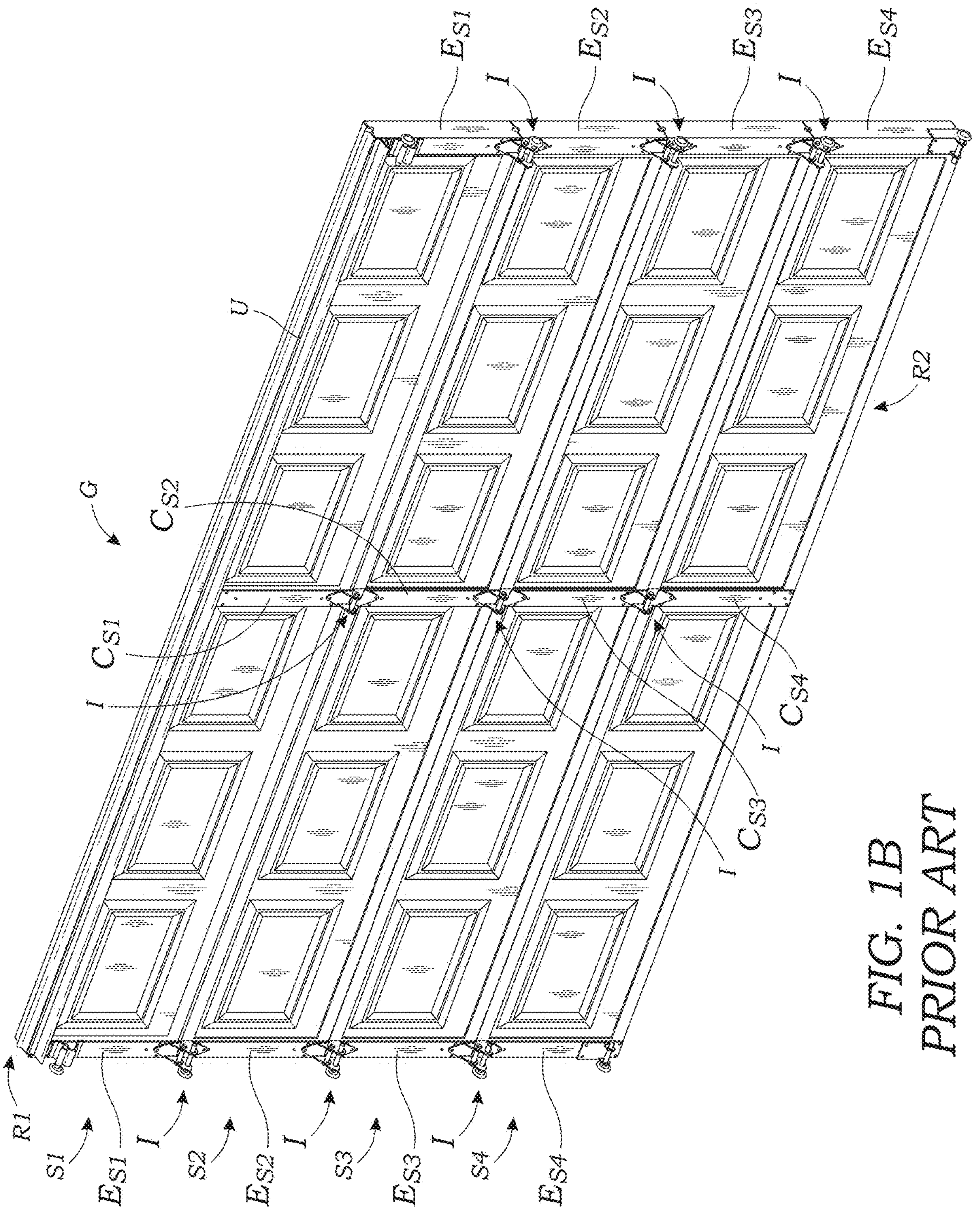
FIG. 1B PRIOR ART
FIG. 1B is a rear perspective view thereof.

Referring first to FIGS. 1A and 1B, there are shown front and rear perspective views of an exemplary prior art residential overhead pan garage door G, here as having four sections S1, S2, S3, S4 arranged vertically and hingeably edge-to-edge as is known in the art, with some details of the door sections and their rails R1, R2, stiles E, C, hinges I, and strut(s) U and related hardware not shown for simplicity. As will be appreciated from particularly FIG. 1B and also FIG. 2 discussed further below, the typical overhead garage door G has each section S1, S2, S3, S4 formed or bent from a material such as sheet metal into a desired configuration in forming the respective face F and its opposite top and bottom rails R1, R2, with a vertical center stile C and opposite end stiles E then assembled onto the rear of each section S1, S2, S3, S4 along with any lengthwise or longitudinal strut U adjacent to typically the upper edge of the respective section S1, S2, S3, S4, with hinges I also assembled on the rear of the door G in hingeably joining the sections S1, S2, S3, S4 together, whether any such hardware is integral or separate and whether installed in any particular sequence, such as certain hardware like the plates of the hinges I and the brackets that secure the struts U sharing common fasteners when being installed on the respective end and center stiles E, C and rails R1, R2 in generally completing the overhead garage door G construction, each such feature or component of the respective door section S1, S2, S3, S4 simply denoted as such in the figures as by including the appropriate indicator "S1", "S2", "S3", "S4" as a subscript to the reference letter for that feature or component as being a component of a particular one of the four door sections, such as the door section faces $F_{S1}$, $F_{S2}$, $F_{S3}$, $F_{S4}$, for example. Once again, the typical width W of such a garage door G is eight feet (8 ft.) in the single-car garage context and sixteen feet (16 ft.) or even eighteen feet (18 ft.) in the two-car garage context, and the typical height H is approximately seven feet (7 ft.) made up of either three horizontal hinged door sections of approximately twenty-eight inches (28 in.) in height each or, as here and is most common, four horizontal hinged door sections S1, S2, S3, S4 of approximately twenty-one inches (21 in.) in height $H_{S1}$, $H_{S2}$, $H_{S3}$, $H_{S4}$ each. The nominal thickness or depth D of the garage door G may again typically be on the order of two inches (2 in.) based on a variety of factors, which is the effective depth or thickness of the door sections S1, S2, S3, S4 not including any additional hardware such as hinges I and struts U. In the industrial overhead or roll-up door context, the doors are typically taller, such as nominally ten feet by ten feet (10 ft.×10 ft.) or twelve feet by fourteen feet (12 ft.×14 ft.), and may even be more "heavy duty" or employ relatively heavier gauge steel or thicker sections, such as for example three inches (3 in.), but it will be appreciated that the individual door sections may still be comparable to residential door sections in height, such as on the order of twenty to thirty inches (20-30 in.), and fundamentally the principles of the present invention would apply with equal benefit in the commercial metal overhead or roll-up door context.

Figure 2:
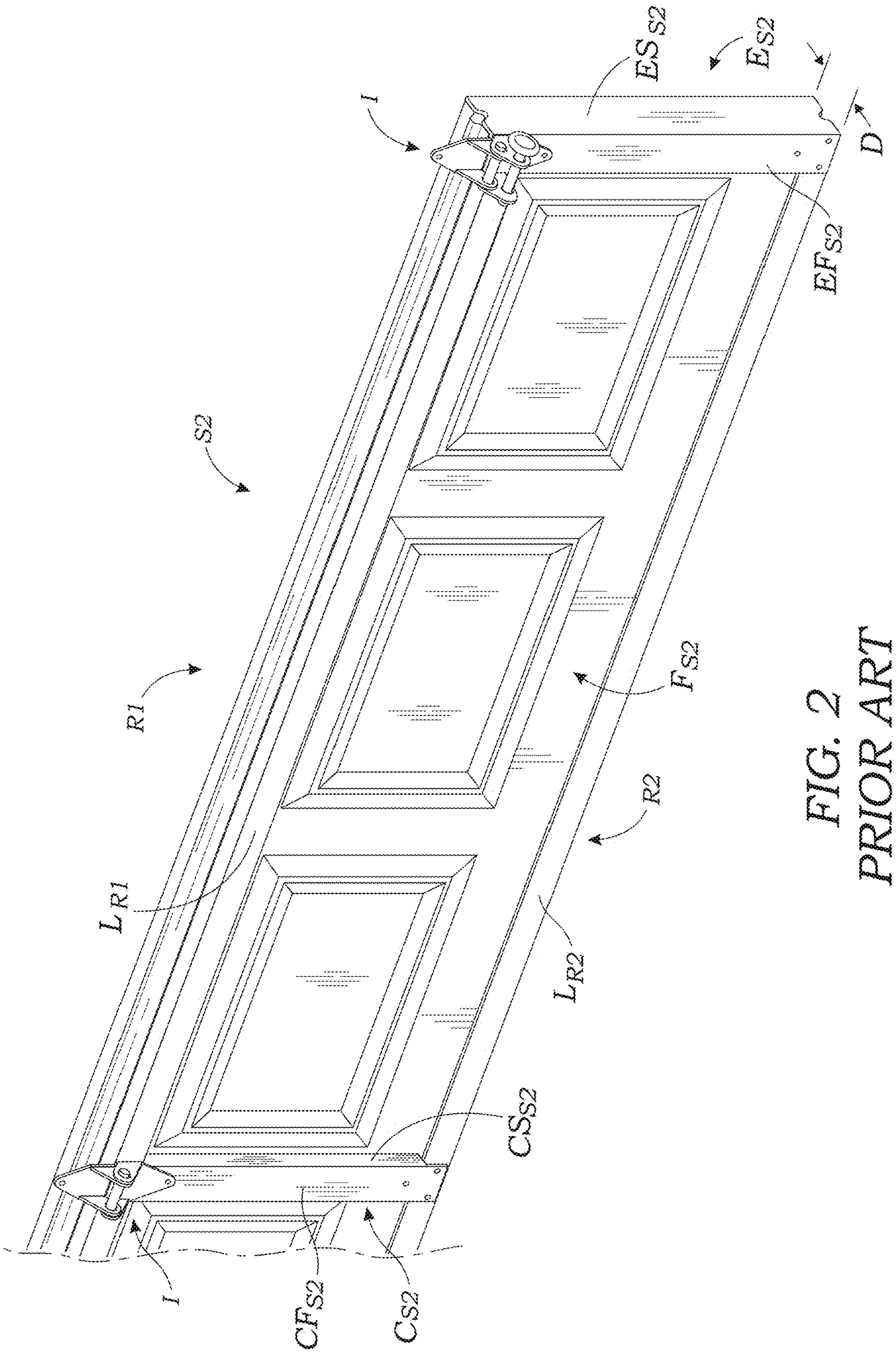
FIG. 2 PRIOR ART
FIG. 2 is an enlarged partial rear perspective view of a single section thereof.

As shown in FIG. 2 illustrating an enlarged partial rear perspective view of a single exemplary prior art door section S2 of a representative residential overhead pan door G as shown in FIGS. 1A and 1B, both the end stile $E_{S2}$ and the center stile $C_{S2}$ are formed as typical "box design stiles" having side walls that are perpendicular to the door face $F_{S2}$ and faces that are offset from and parallel to the door face $F_{S2}$—specifically, as shown, the end stile $E_{S2}$ has an end stile side wall $ES_{S2}$ that is perpendicular to the door face $F_{S2}$ and so provides effectively an end cap on each end of the door section S2 and further has an end stile face $EF_{S2}$ that is perpendicular to the end stile side wall $ES_{S2}$ and offset from and parallel to the door face $F_{S2}$, and similarly the center stile $C_{S2}$ has opposite center stile side walls $CS_{S2}$ that are perpendicular to the door face $F_{S2}$ and a center stile face $CF_{S2}$ that is perpendicular to and spans the opposed center stile side walls $CS_{S2}$ and is again offset from and parallel to the door face $F_{S2}$. As such and will be appreciated and well understood by those skilled in the art, the respective stile faces $EF_{S2}$, $CF_{S2}$ are configured to overlap the legs $L_{R1}$, $L_{R2}$ of the respective top and bottom rails R1, R2 so as to secure the end stiles $E_{S2}$ and center stile $C_{S2}$ thereto and thus on the door section S2.

Figure 3:
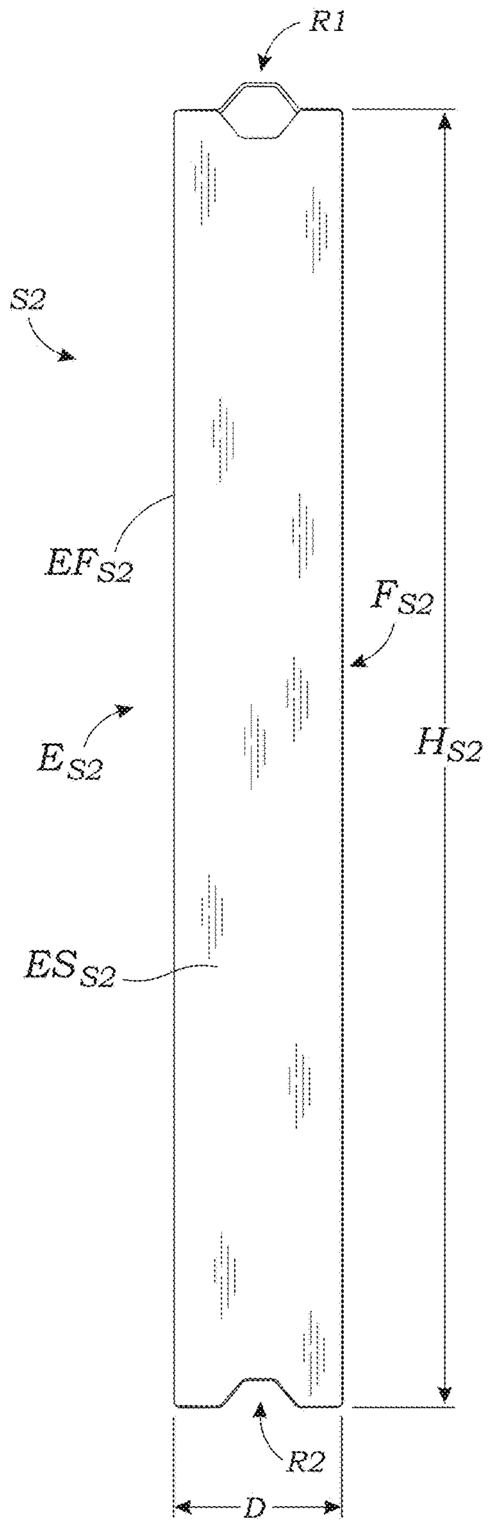
FIG. 3 PRIOR ART
FIG. 3 is an enlarged end view of a single section thereof.
Figure 4:
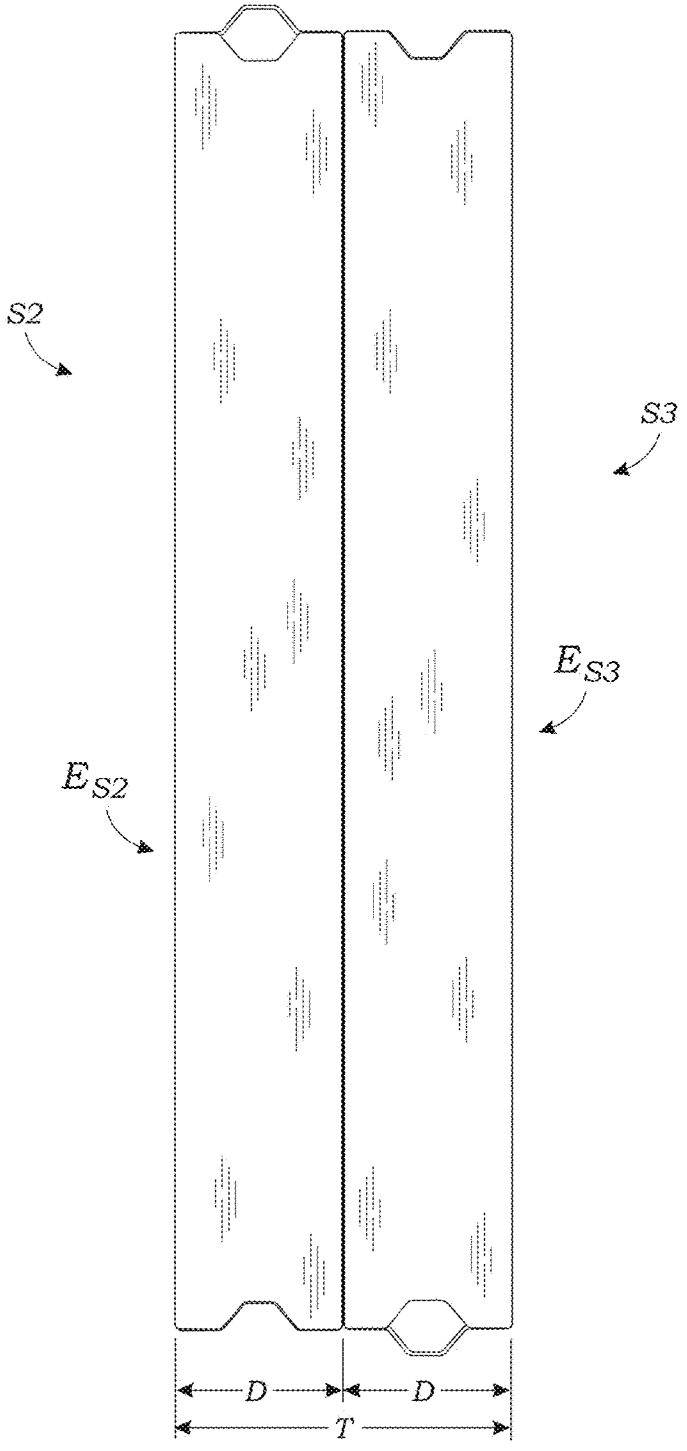
FIG. 4 PRIOR ART
FIG. 4 is an enlarged end view of two sections thereof stacked together in abutting relationship.

Accordingly, as will also be appreciated with further reference to the enlarged end view of the single door section S2 of FIG. 3 along with continued reference to FIG. 2, the hardware such as the hinges I being removed from the section S2 for simplicity in FIG. 3 as would commonly be the case when such door sections S2 are stored and shipped pre-assembly, the typical prior art end stile $E_{S2}$ again caps or encloses the end of the door section S2 as by the end stile side wall $ES_{S2}$ spanning between the forwardly-facing door section face $F_{S2}$ at the front of the section S2 and the rearwardly-facing downwardly-oriented top rail leg $L_{R1}$ and opposite upwardly-oriented bottom rail leg $L_{R2}$ at the rear of the section S2, with the end stile face $EF_{S2}$ again being formed perpendicular to the end stile side wall $ES_{S2}$ so as to extend laterally along the back of the section S2 and thus lie adjacent to the top and bottom rail legs $L_{R1}$, $L_{R2}$ at the respective top and bottom ends of the end stile face $EF_{S2}$ again parallel to and offset from the section face $F_{S2}$. The same general observations would be true of any center stile $C_{S2}$ in terms of its face $CF_{S2}$ spanning the top and bottom rail legs $L_{R1}$, $L_{R2}$ at the respective top and bottom ends of the center stile face $CF_{S2}$ again parallel to and offset from the section face $F_{S2}$. Those skilled in the art will thus appreciate once more that the profile of the end and center stiles $E_{S2}$, $C_{S2}$ as conforming to and spanning the profile of the door section S2 as defined by the face $F_{S2}$ and the top and bottom rails R1, R2 leads to the indicated thickness or depth D of the section S2 across its entire height $H_{S2}$ or a constant thickness or depth D between opposite rails R1, R2. The result as shown in FIG. 4 is that when such typical door sections S2, S3 with full-depth or full-profile stiles E, C are then stacked together pre-assembly as for storage and transport, they can only abut each other and are not able to nest in any way to reduce the overall stack height of the two stacked sections S2, S3, which overall or combined thickness T is then depth D plus depth D (or 2×D), with no storage efficiencies or economies gained, and that whether or not the rails R1, R2 of one section S2 are adjacent to the rails R1, R2 of the other section S3. In the exemplary prior art overhead pan door section S having a nominal thickness or depth D of two inches (2 in.), it follows that two such sections S stacked together would have a nominal stack height or thickness T of four inches (4 in.), three such sections S stacked together would have a nominal stack height or thickness of six inches (6 in.), and so on, more about which is said below in connection with storage and transport of such door sections S in use. Moreover, it will be appreciated that once two sections S2, S3 are stacked together in abutting relationship as shown, in any orientation relative to each other, the full profile end stiles $E_{S2}$, $E_{S3}$ prevent insertion of any door hardware or access to and removal of any door hardware between the sections S2, S3. As such and inconveniently, door hardware can only be inserted between the door sections S2, S3 prior to them being stacked together and can only be accessed and removed after the sections S2, S3 are unstacked or separated, and that only for such hardware that is shorter or smaller than the gap between adjacent full depth or profile stiles E, C, thus again preventing storing longer hardware such as struts, drive tubes, door tracks, and trim pieces at all between stacked sections S2, S3, which must instead be stored or packaged completely outside of or separate from such stacked sections S2, S3, again, more about which is said below in comparing such prior art pan doors to pan doors with low-profile stiles and/or hinges according to aspects of the present invention in terms of storage and transport.

Figure 5:
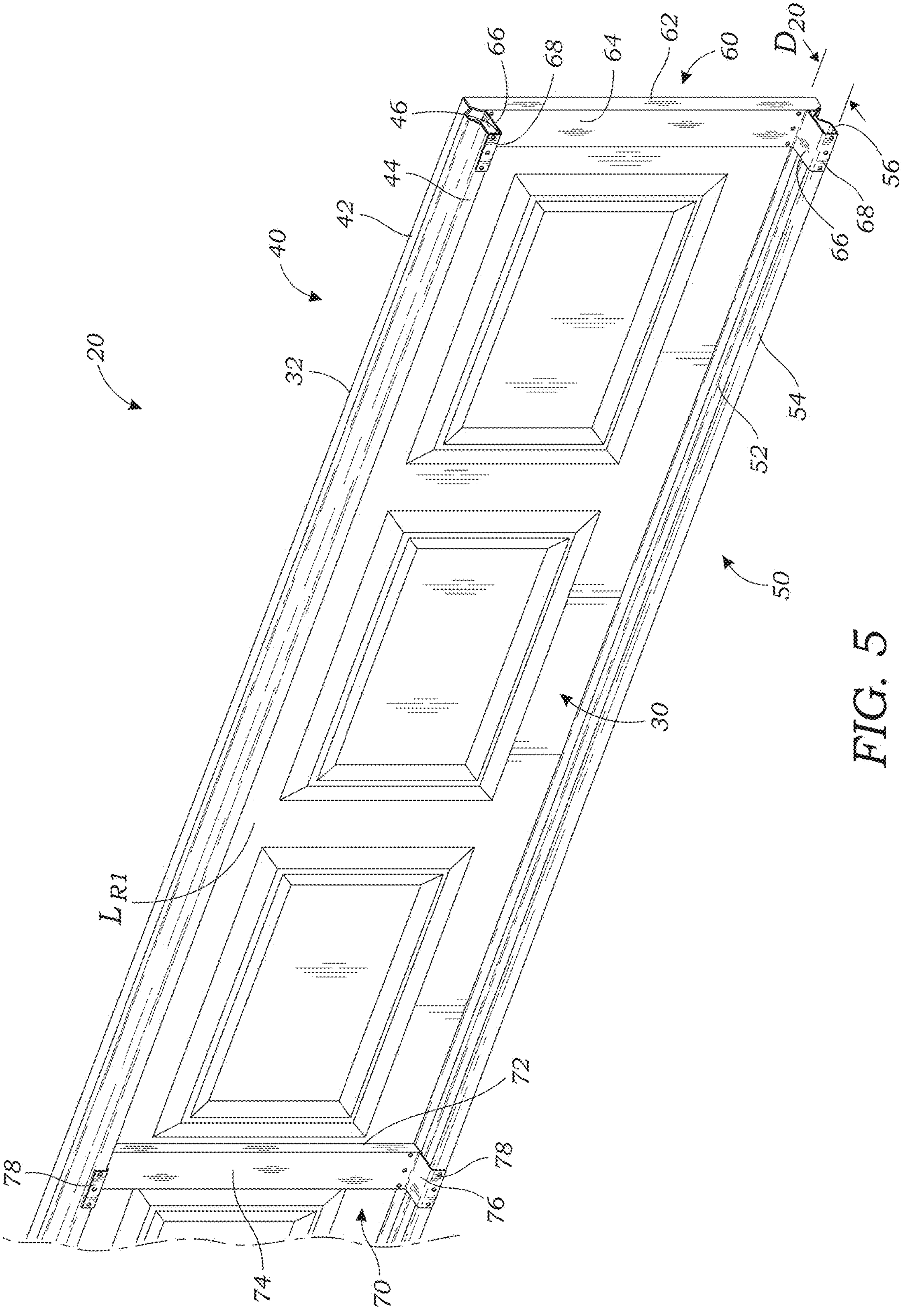
FIG. 5 is an enlarged partial rear perspective view of an exemplary pan garage door section having a low-profile end stile and a low-profile center stile, in accordance with at least one embodiment.
Figure 6:
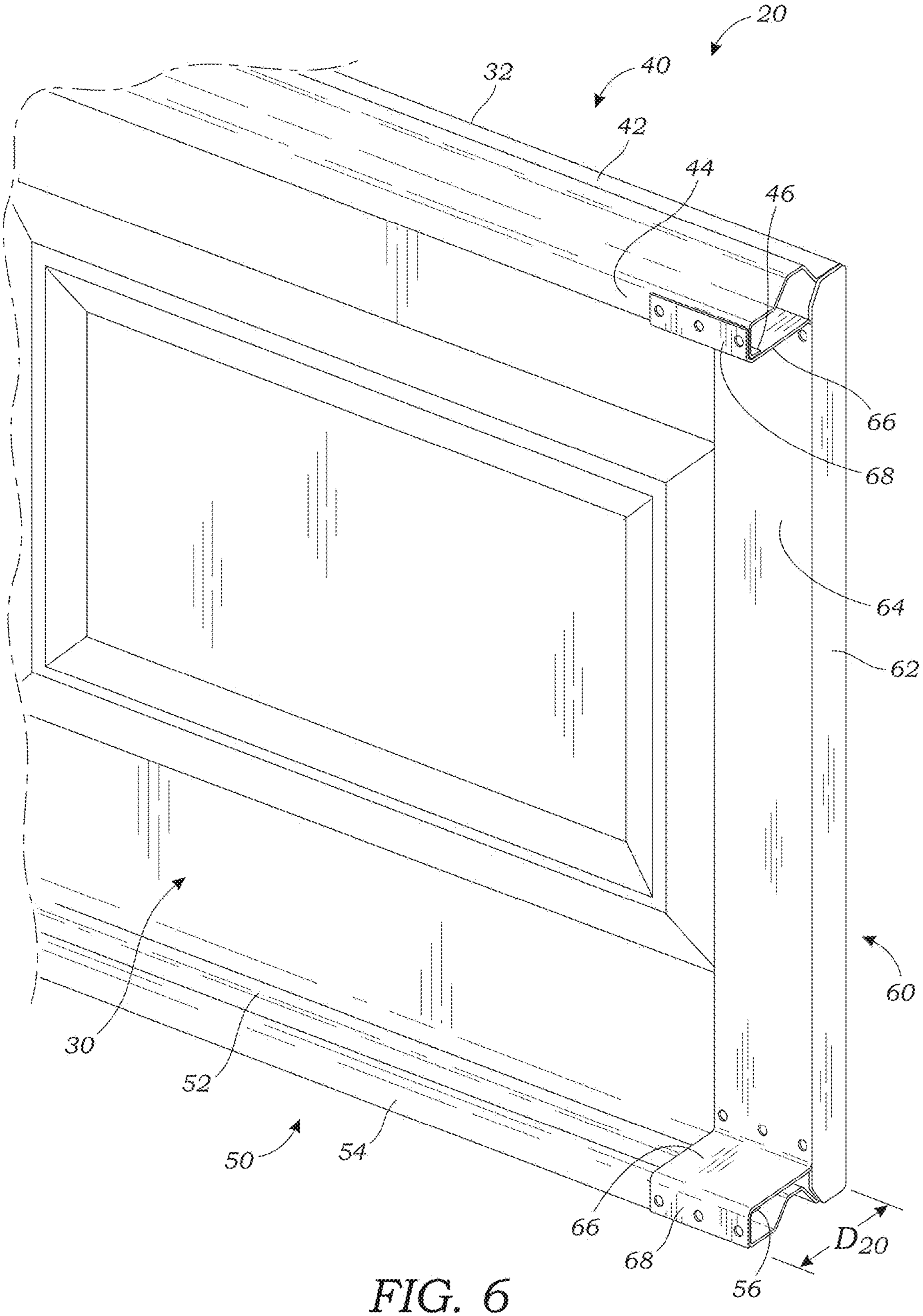
FIG. 6 is a further enlarged partial rear perspective view thereof showing the exemplary pan garage door section with the low-profile end stile.

Turning now to FIGS. 5 and 6, there are shown partial rear perspective views of a single exemplary door section 20 of a representative residential overhead pan door G as in FIG. 1 generally having a face 30 and opposite top and bottom rails 40, 50 as in a typical pan door section, now according to aspects of the present invention having a new and improved low-profile end stile 60 at each end of the section 20 and a new and improved low-profile center stile 70 at an intermediate location along the section 20. In a bit more detail first regarding the exemplary door section 20, the section 20 again comprises a vertical substantially planar face 30, whether or not stamped or embossed, with an integral top rail 40 and opposite integral bottom rail 50 formed from a single piece of sheet metal or the like in a manner known in the art, though of course other configurations and materials and methods of fabrication of such a pan door section 20, whether now known or later developed in the art, are possible. Specifically, the top rail 40 is formed having a top rail body 42 that extends substantially rearwardly and perpendicularly from the longitudinal top edge 32 of the door face 30 and terminates in a downwardly extending top rail leg 44 that is substantially perpendicular to the top rail body 42 and thus substantially parallel to and offset from the door face 30, with the top rail leg 44 then optionally terminating in a relatively shorter forwardly extending top rail foot 46 that is thus substantially perpendicular to both the top rail leg 44 and the door face 30 and is thus substantially parallel to and offset from the top rail body 42. Similarly, the bottom rail 50 is formed having a bottom rail body 52 that extends substantially rearwardly and perpendicularly from the longitudinal bottom edge 34 of the door face 30 and terminates in an upwardly extending bottom rail leg 54 that is substantially perpendicular to the bottom rail body 52 and thus substantially parallel to and offset from the door face 30, with the bottom rail leg 54 then again optionally terminating in a relatively shorter forwardly extending bottom rail foot 56 that is thus substantially perpendicular to both the bottom rail leg 54 and the door face 30 and is thus substantially parallel to and offset from the bottom rail body 52. As a threshold matter, it is noted that all directional indications are relative and simply for reference, with it being understood that forward or forwardly means the direction the front or outer surface of the garage door G faces, rear or rearwardly means the direction the back or inner surface of the garage door G faces, down or downwardly means toward the bottom of the garage door G, and up or upwardly means toward the top of the garage door G when in its closed or vertical configuration such as shown in FIGS. 1A and 1B. As also shown in FIGS. 1-4 for the prior art typical door section as well as in FIGS. 5 and 6 and is known in the art, the top and bottom rail bodies 42, 52 may be formed with bends defining mating features when one garage door section is vertically arranged relative to another along adjacent edges as when operationally installed, here shown as a tongue-and-groove or male-female arrangement, though it will be appreciated that other such configurations are possible and are or may be employed in the art. Once again, in the exemplary four-section overhead garage door G, each door section such as the illustrated section 20 has a height $H_{20}$ as shown in the end views of FIGS. 7 and 8 that is nominally twenty-one inches (21 in.), which is specifically the height of the door face 30 defined between the longitudinal face top and bottom edges 32, 34 or the points where the top and bottom rail bodies 42, 52 are formed as by being bent rearwardly from the door face 30, and has a nominal or maximum depth $D_{20}$ that is essentially the front-to-back thickness of the section 20 from the forwardly-oriented door face 30 to the offset rearwardly-facing rail legs 44, 54, again, thereby defining a full depth $D_{20}$ of the section 20 not including any further rearwardly-oriented hardware such as hinges I and struts U (FIGS. 1B and 2), which depth $D_{20}$ may again be nominally two inches (2 in.) for example.

Figure 7:
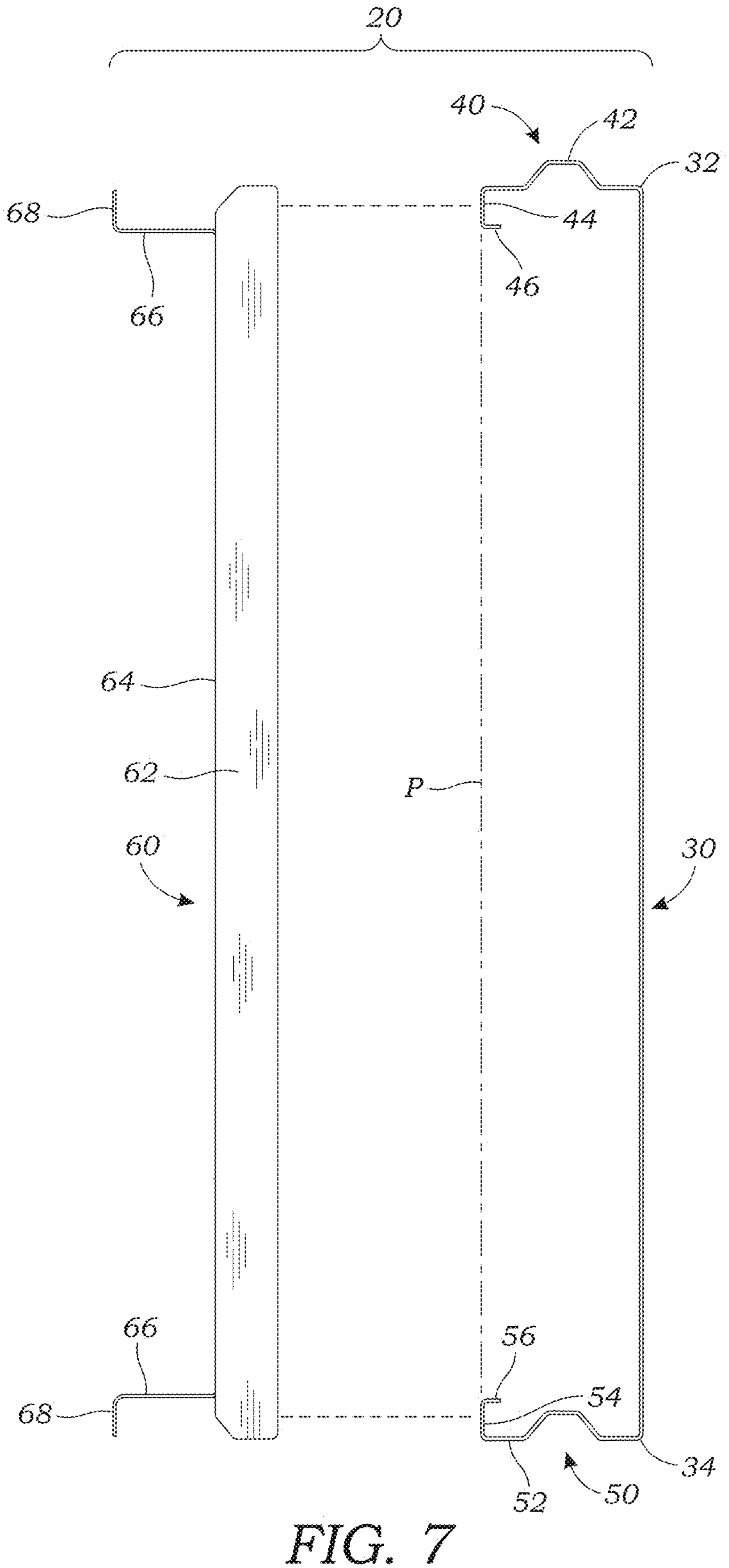
FIG. 7 is an exploded end view thereof.
Figure 8:
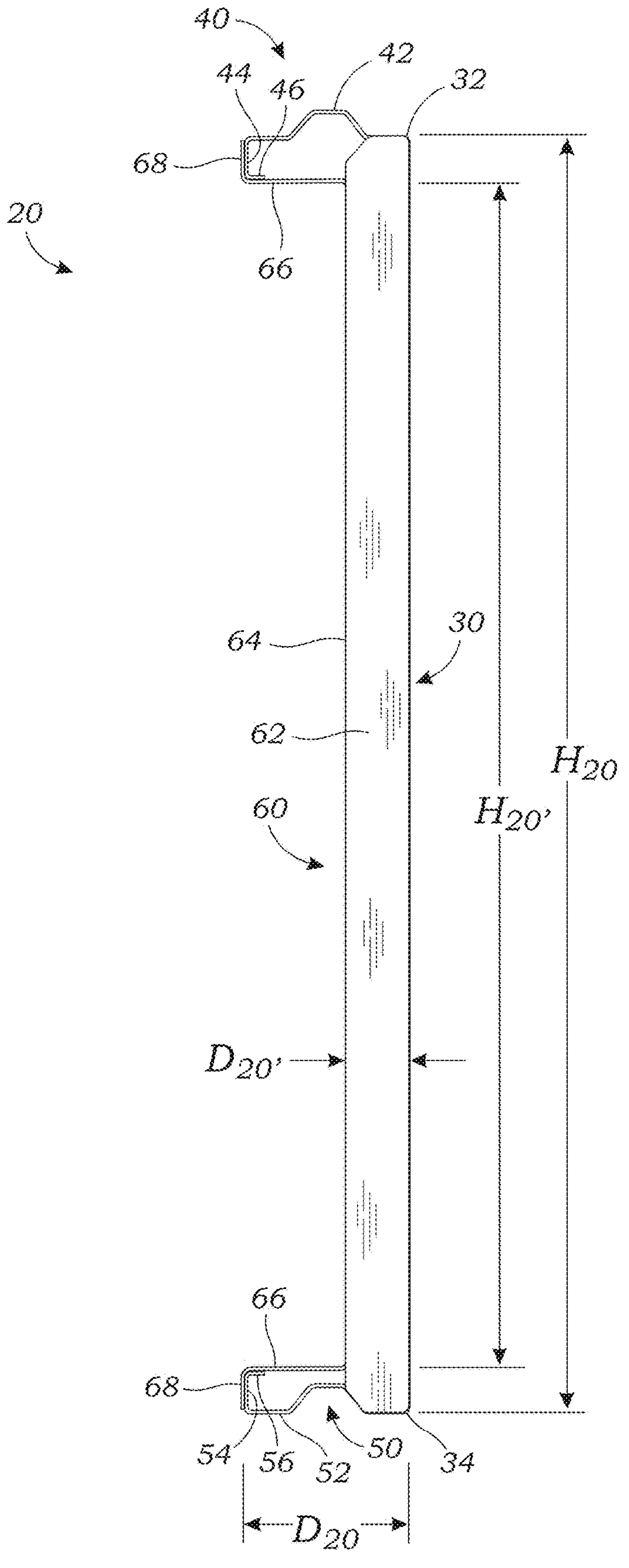
FIG. 8 is an assembled end view thereof.

With continued reference to FIGS. 5 and 6 and now also FIGS. 7 and 8, notably, rather than as in the prior art pan door section S as shown in FIGS. 2-4 having conventional full-profile "box design" end and center stiles $E_{S2}$, $C_{S2}$ that conform to and span the profile of the door section S2 as defined by the face $F_{S2}$ and the top and bottom rails R1, R2 such that the depth D of the door section S2 including the end and center stiles $E_{S2}$, $C_{S2}$ is constant across its entire height $H_{S2}$ between opposite rails R1, R2, in the door section 20 according to aspects of the present invention both the end stiles 60 and any center stile 70 are formed having a low-profile configuration between the opposite top and bottom rails 40, 50 such that the thickness or depth $D_{20}$ of the section 20, generally defined as the perpendicular distance between the door section face 30 (which for simplicity is shown as flat rather than having any embossing and regardless is generally planar) and the plane P of the opposite top and bottom rail legs 44, 54, is not constant across its entire height $H_{20}$ between opposite rails 40, 50 or as also accounting for the end and center stiles 60, 70. Specifically, each end stile 60 is formed having at least one end stile side wall 62 that is perpendicular to the door face 30 and having an end stile face 64 that is integral with and perpendicular to the end stile side wall(s) 62 offset from and parallel to the section face 30, but here the end stile face 64 being offset from the plane P of the top and bottom rail legs 44, 54 toward the door face 30 when the stile 60 is assembled on the face 30 and rails 40, 50 in forming the door section 20 such that the thickness or depth $D_{20'}$ of the section 20 across the low-profile end stile 60 between the rails 40, 50 as defined by the spacing or the offset of the end stile face 64 from the section face 30 is reduced or is only a fraction of the full-profile thickness or depth $D_{20}$ of the door section 20, as shown and best seen in the assembled end view of FIG. 8. To then configure such a low-profile end stile 60 with offset end stile face 64 still for engagement with the top and bottom rails 40, 50 of the door section 20 when assembling the end stiles 60 thereon, each end stile 60 is further formed having opposite end stile risers 66 integral with and extending substantially rearwardly and perpendicularly from opposite top and bottom ends of the end stile face 64 and terminating in opposite upwardly and downwardly extending end stile flanges 68 that when the end stile 60 is installed lie along at least a portion of the respective top and bottom rail legs 44, 54, whereby each end stile 60 can be secured on the door section 20 as by fastening each end stile flange 68 to the respective top and bottom rail leg 44, 54 employing any appropriate means now known or later developed. Similarly, as shown in FIG. 5, any center stile 70 is again formed having one or more center stile side wall 72 that is perpendicular to the door face 30 and a center stile face 74 that is integral with and perpendicular to the center stile side wall(s) 72 offset from and parallel to the section face 30, the center stile face 74 here once again being offset from the plane P of the top and bottom rail legs 44, 54 toward the door face 30 when the center stile 70 is installed such that the thickness or depth $D_{20'}$ of the section 20 across the low-profile center stile 70 between the rails 40, 50 as defined by the spacing or the offset of the center stile face 74 from the section face 30 is also reduced or is only a fraction of the full-profile thickness or depth $D_{20}$, as again for the end stiles 60 as shown and best seen in FIG. 8. It will thus be appreciated that the reduced thickness or depth $D_{20'}$ of the middle portion of the door section 20 between the rails 40, 50 made possible by the low-profile end and center stiles 60, 70 is effectively defined by or is equivalent to the height of the respective end and center stile side walls 62, 72 on which the end and center stile faces 64, 74 are formed. And also as for the low-profile end stiles 60, to then configure the low-profile center stile 70 with offset center stile face 74 still for engagement with the top and bottom rails 40, 50 of the door section 30 when assembling any such center stile 70 thereon, each center stile 70 is further formed having opposite center stile risers 76 integral with and extending substantially rearwardly and perpendicularly from opposite top and bottom ends of the center stile face 74 and terminating in opposite upwardly and downwardly extending center stile flanges 78 that when the center stile 70 is installed on the door section 20 lie along at least a portion of the respective top and bottom rail legs 44, 54, whereby each center stile 70 can also be secured on the door section 20 as by fastening each center stile flange 78 to the respective top and bottom rail leg 44, 54 again employing any appropriate means now known or later developed. And where the top and bottom rails 40, 50 further comprise top and bottom rail feet 46, 56 extending forwardly from the respective top and bottom rail legs 44, 54 opposite the top and bottom rail bodies 42, 52, it will be appreciated that at least a portion of the end and center stile risers 66, 76 thus would lie along such top and bottom rail feet 46, 56 in much the same way that the end and center stile flanges 68, 78 lie along the top and bottom rail legs 44, 54 and regardless that the length of the top and bottom rail legs 44, 54 along with the overall height $H_{20}$ of the door section 20 sets or limits the length of the end and center stile faces 64, 74 and the positions of the end and center stile risers 66, 76 between the top and bottom rails 40, 50. In any case, or for a door section 20 of any height $H_{20}$, the maximum and preferred length or height $H_{20'}$ of the end and center stile faces 64, 74 would thus nominally be the overall door section height $H_{20}$ minus the lengths of the top and bottom rail legs 44, 54, which would thus define the distance or opening spanned by the low-profile end and center stiles 60, 70 substantially entirely between the top and bottom rails 40, 50.

Those skilled in the art will appreciate that by virtue of such reduced thickness or depth $D_{20'}$ low-profile middle portion along the entire length of each door section 20 according to aspects of the present invention as facilitated by the low-profile end and center stiles 60, 70 with the offset end and center stile faces 64, 74 spanning between the door section top and bottom rails 40, 50 and spaced from the plane P of the top and bottom rail legs 44, 54, it is thus possible to "stagger stack" such door sections 20 in a nested arrangement to reduce the overall stack height or thickness of two or more such door sections 20 as would otherwise not be the case at the full-profile section thickness or depth $D_{20}$, which it will be appreciated has tremendous benefits in storage and transport. Furthermore, due particularly to the end stile side walls 62 not being full-profile or full-thickness of the door section 20 as defined by the face 30 and rails 40, 50, the space between such stagger-stacked or nested door sections 20 is still accessible from either end of the sections 20. More about the nested stacking of such door sections 20 with low-profile end and center stiles 60, 70 and the attendant advantages thereof in storage and shipping and handling, and that with or without hinges 80 of any particular configuration and with or without a variety of door hardware items stored therebetween, is described below in connection with FIGS. 9-14. Relatedly, it will once again be appreciated by those skilled in the art that all drawing figures are schematic and not to be taken literally or to scale and that the dimensions, proportionality, and overall configurations of the inventive low-profile end and center stiles 60, 70 as part of the new and novel pan overhead garage door section 20 according to aspects of the present invention can vary without departing from the spirit and scope of the invention such that the configurations shown and described are to be understood as exemplary and non-limiting such as in the context of a nominal two-inch thick door section 20, so long as entirely between the door section top and bottom rails 40, 50 the stile faces 64, 74 are offset or inset from the plane P of the top and bottom rail legs 44, 54 toward the door face 30. By way of further illustration and not limitation, for an exemplary door section 20 having a nominal full-profile thickness or depth $D_{20}$ from the door face 30 to the opposite top and bottom rail legs 44, 54 of two inches (2 in.), the thickness or depth $D_{20'}$ of the offset low-profile portion of such a door section 20 according to aspects of the present invention defined by the end and center stiles 60, 70 and particularly the locations of the end and center stile faces 64, 74, fixed either by the end and center stile side walls 62, 72 as extending rearwardly from the door face 30 or by the end and center stile risers 66, 76 as extending forwardly from the end and center stile flanges 68, 78 adjacent to the top and bottom rail legs 44, 54, in either case setting the location or depth $D_{20'}$ of the end and center stile faces 64, 74 as offset or spaced from the section face 30 and thus defining the low-profile portion of the door section 20, is nominally in the range of one-half inch to one inch (0.5-1.0 in.), still more preferably in the range of five-eighths inch to seven-eighths inch (0.625-0.875 in.), and most preferably in the range of eleven-sixteenths inch to thirteen-sixteenths inch (0.688-0.813 in.). For a nominal thickness or depth $D_{20}$ full-profile door section 20 of two inches (2 in.), then, in the exemplary embodiment, the low-profile stile depth $D_{20'}$ would preferably not be more than one inch (1 in.) or fifty percent of the nominal or overall section depth $D_{20}$, or the offset location of the end and center stile faces 64, 74 would not be more than one inch (1 in.) from the door face 30 as set by the height of the end and center stile side walls 62, 72 or would be at least one inch (1 in.) from the plane P of the top and bottom rail legs 44, 54 as set by the length of the end and center stile risers 66, 76. By way of further illustration and not limitation, based on current pan door hardware and specifically the configuration and installation of the typical bottom bracket (not shown), the low-profile depth $D_{20'}$ of the end and center stile faces 64, 74 between the rails 40, 50 for a nominal two-inch pan door section 20 may be in the range of 0.79 in. to 0.89 in. as having sufficient structure for hardware installation while optimizing the nesting of such door sections 20 as herein described and still leaving sufficient space even between nested sections 20 and specifically opposed low-profile stiles 60, 70, and more particularly the end and center stile faces 64, 74, for storing and accessing or inserting and removing door hardware. Fundamentally, in any such door section 20 according to aspects of the present invention with new and improved low-profile end and center stiles 60, 70 as set forth herein having respective end and center stile faces 64, 74 that are offset or inset from the plane P of the top and bottom rail legs 44, 54 so as to be parallel to and relatively closer to the door section face 30 entirely between the top and bottom rails 40, 50, the intermediate reduced thickness or depth $D_{20'}$ as set by the low-profile end and center stiles 60, 70 as herein described would preferably be in the range of twenty-five to fifty percent (25-50%) of the overall nominal thickness or depth $D_{20}$ of the section 20 ($0.25\times D_{20}$ to $0.5\times D_{20}$).

Figure 9:
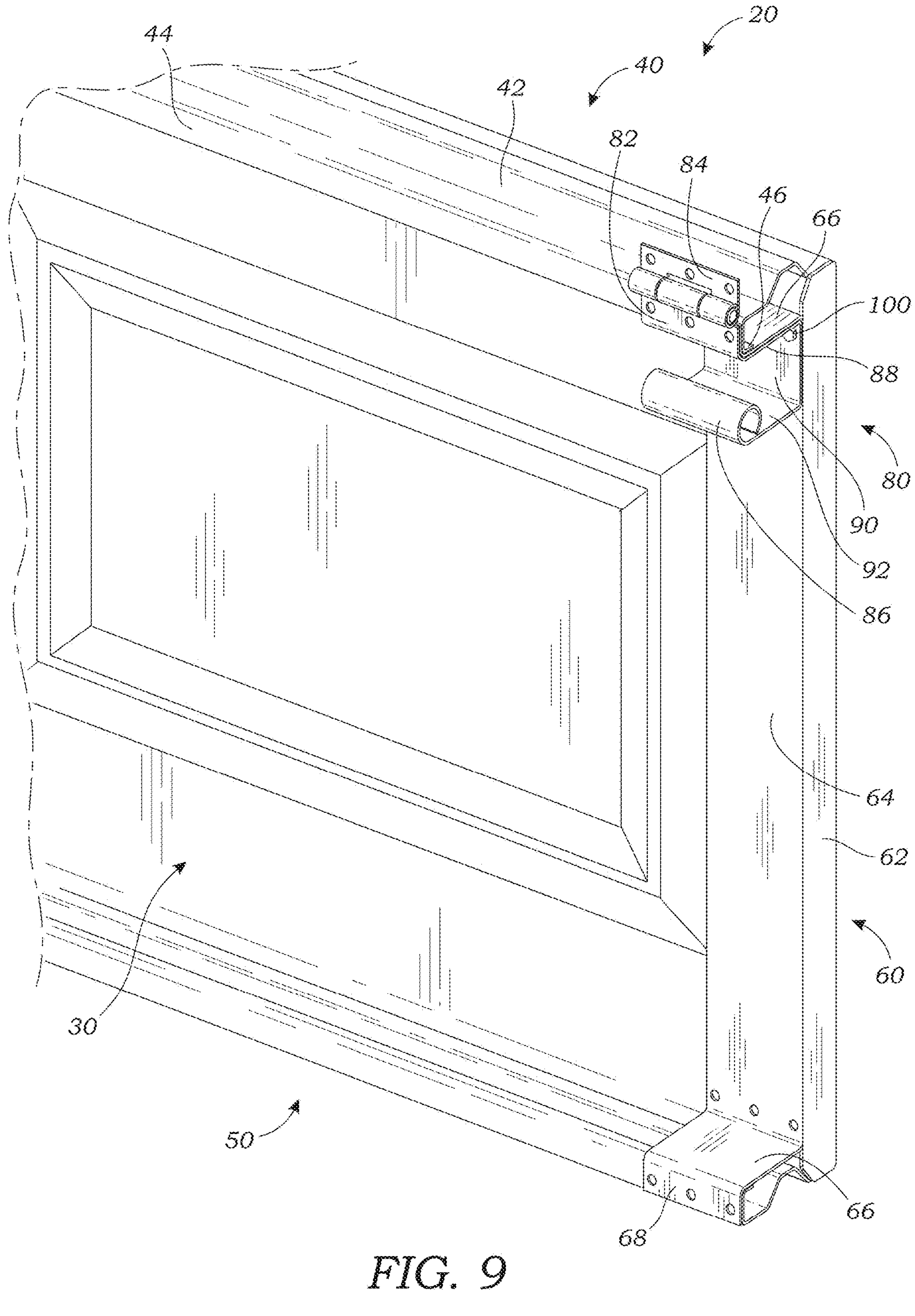
FIG. 9 is a further partial rear perspective view thereof having a first exemplary low-profile hinge installed thereon, in accordance with at least one embodiment.
Figure 10:
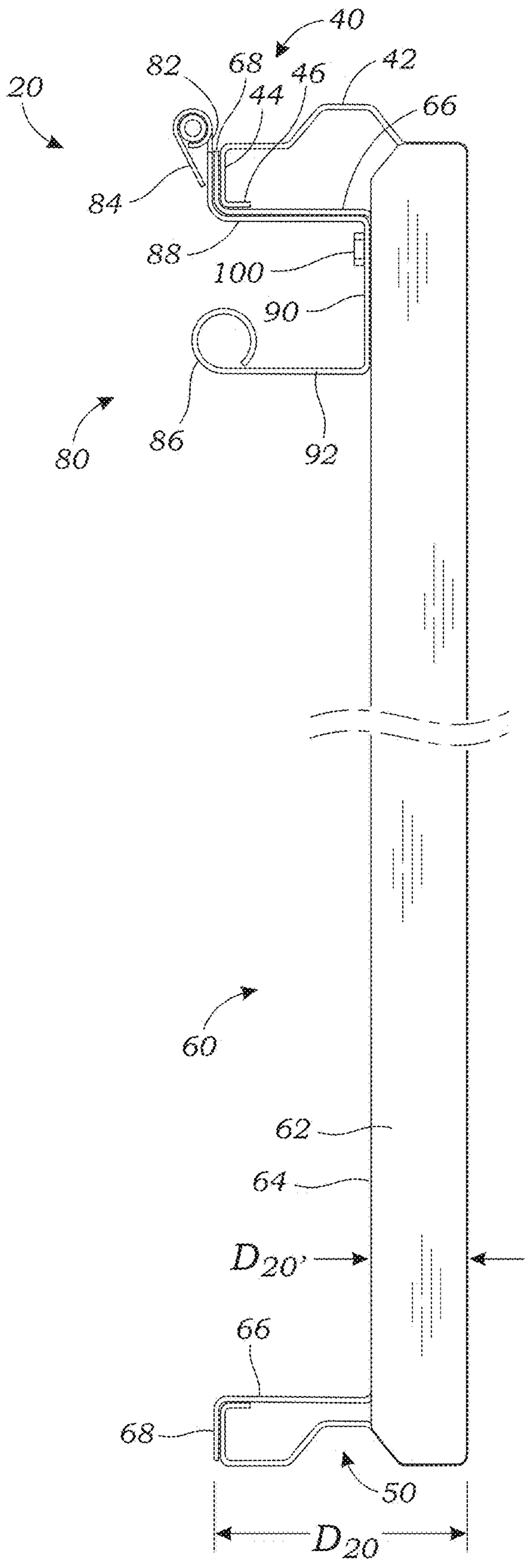
FIG. 10 is an enlarged end view thereof.
Figure 11:
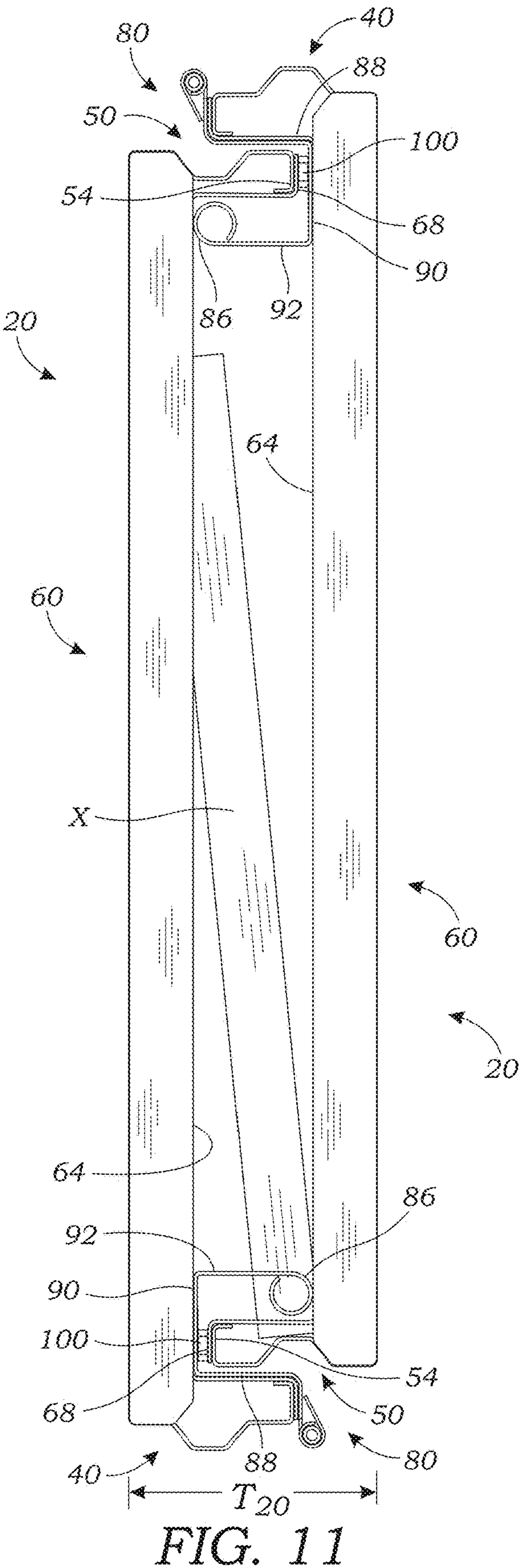
FIG. 11 is a reduced-scale end view of two sections thereof stacked together in nesting relationship.

Turning next to FIGS. 9-11, there are shown rear perspective and end views of the exemplary door section 20 of FIGS. 5-8 now with a first exemplary low-profile hinge 80 installed along or at the top rail 40 here on an end stile 60, though also being installed similarly 5 on any center stile 70. Such hinge 80 generally comprises pivotally coupled first and second hinge plates 82, 84 for hingeably joining adjacent door sections 20 during door assembly and a roller support 86. In the first exemplary low-profile hinge 80, the roller support 86 is spaced from or positioned spatially apart from the first and second hinge plates 82, 84 as by forming a forwardly-extending riser plate 88 on and substantially perpendicular to the first hinge plate 82 that is mounted on and thus parallel to both the end stile flange 68 and the top rail leg 44, the riser plate 88 thus being substantially parallel to the top rail body 42 and any top rail foot 46 and substantially parallel and adjacent to the end stile riser 66 and substantially perpendicular to the door face 30, the riser plate 88 terminating forwardly at the end stile face 64 in an integral perpendicular downwardly-extending mounting plate 90 that is thus substantially parallel and adjacent to the end stile face 64, the mounting plate 90 then terminating in an integral perpendicular rearwardly-extending roller support plate 92 that is thus parallel to and offset from the riser plate 88, with the roller support 86 formed on the end of the roller support plate 92 opposite of the mounting plate 90, thus positioning the roller support 86 spaced below and offset from the first hinge plate 82 as shown. Those skilled in the art will appreciate that the exemplary hinge 80 other than the separate second hinge plate 84 and so even including the first hinge plate 82 all the way to the roller support 86 may thus be formed out of a single piece of steel or other metal employing any appropriate material and method of manufacture now known or later developed. And the resulting configuration of the hinge 80 thus sets the depth or spatial location of the roller support 86 and thus any roller (not shown) relative to the door section 20 accordingly, again in any appropriate manner suitable to the context in terms of positioning any such roller support 86 and thus roller relative to any track (not shown) in which the finished door will operate. Fasteners 100 such as hex-head machine screws are shown as installing the hinge 80 as through the mounting plate 90 and into the end stile face 64, though instead or in addition, any such fasteners 100 can also be installed through the first hinge plate 82 into both the end stile flange 68 and the top rail leg 44 as is the case for the alternative exemplary hinge 80 shown in FIGS. 12-14. It will again be appreciated that any such fasteners 100 in terms of type and location, whether now known or later developed, as assembling such components in forming the finished pan overhead garage door section 20 according to aspects of the present invention may be employed. As shown in FIG. 11, two door sections 20 having the exemplary hinges 80 of FIGS. 9 and 10 mounted on the end and center stiles 60, 70 along or at the top rail 40 of each may be stacked together in an inverted nesting arrangement wherein the bottom rail 50 of one door section 20 is seated adjacent to the hinge 80 at the top rail 40 of the other door section 20 specifically between the riser plate 88 on one side of the bottom rail 50 and the roller support 86 and roller support plate 92 on the other side. In fully nesting the two sections 80 together, where fasteners 100 such as hex-head screws are employed in installing the hinge 80 on the end or center stile 60, 70 as by passing through the mounting plate 90 into the end or center stile face 64, 74, as shown, the end or center stile flange 68, 78 adjacent to the bottom rail leg 54 of one door section 20 would then seat on the head of the hinge fastener 100 of the other nested door section 20 while the hinge roller support 86 thereof would simultaneously seat on the end or center stile face 64, 74 of the first door section 20. The resulting overall thickness $T_{20}$ of the two nested door sections 20 even with pre-installed hinges 80 is thus considerably less than when two conventional door sections S2, S3 each having a full-profile thickness or depth D are stacked together in abutting relationship without the ability to nest, which again for a nominal two-inch door section S2, S3 (D=2 in.) results in a stack height or overall thickness T of the two door sections S2, S3 of four inches (4 in.) (FIG. 4). By comparison, even with the nominal full-profile thickness or depth $D_{20}$ of the exemplary door sections 20 according to aspects of the present invention also being two inches (2 in.), with the low-profile end and center stiles 60, 70 setting a reduced depth $D_{20'}$ for each door section 20 between its top and bottom rails 40, 50 such that again the bottom rail 50 of one door section 20 seats adjacent to the offset or inset end or center stile face 64, 74 of the other door section 20, noting also that such staggered nesting positions the top rail 40 of each door section 20 including the first and second hinge plates 82, 84 outside of or spaced from the other door section 20 so that there is no interference therebetween, the result is a total stack height or thickness $T_{20}$ in this example of approximately three inches (3 in.), as again compared to a stack height or thickness T of two conventional two-inch pan door sections S2, S3 with "box design" stiles $E_{S2}$, $E_{S3}$ (FIGS. 3 and 4) of four inches (4 in.), a twenty-five percent (25%) reduction in stack height for two nested sections 20, and that with the conventional two-inch pan door stack also not having any hinges pre-installed or any hardware contained between the stacked sections, particularly not any relatively longer hardware again such as struts, drive tubes, door tracks, and trim pieces, which then have to be separately packaged and stored and transported. More about the benefits of such a reduced stack height or thickness $T_{20}$ of two or more door sections 20 according to aspects of the present invention stacked in nesting relationship even with door hardware therebetween is described below regarding complete doors as being stored or shipped in quantities (e.g., truck trailer loads). As also shown in FIG. 11, a box X containing relatively smaller door hardware such as rollers, brackets, screws and other fasteners, etc. may be placed between the nested sections 20 and specifically even down between opposite stiles 60, 70 and hinges 80 and may be easily accessed (inserted or removed) even with the sections 20 nested as shown. Those skilled in the art will appreciate that a variety of sizes and shapes of boxes X or other containers may conveniently be stored between nested door sections 20 according to aspects of the present invention, such that the exemplary box X is to be understood as merely illustrative.

Figure 12:
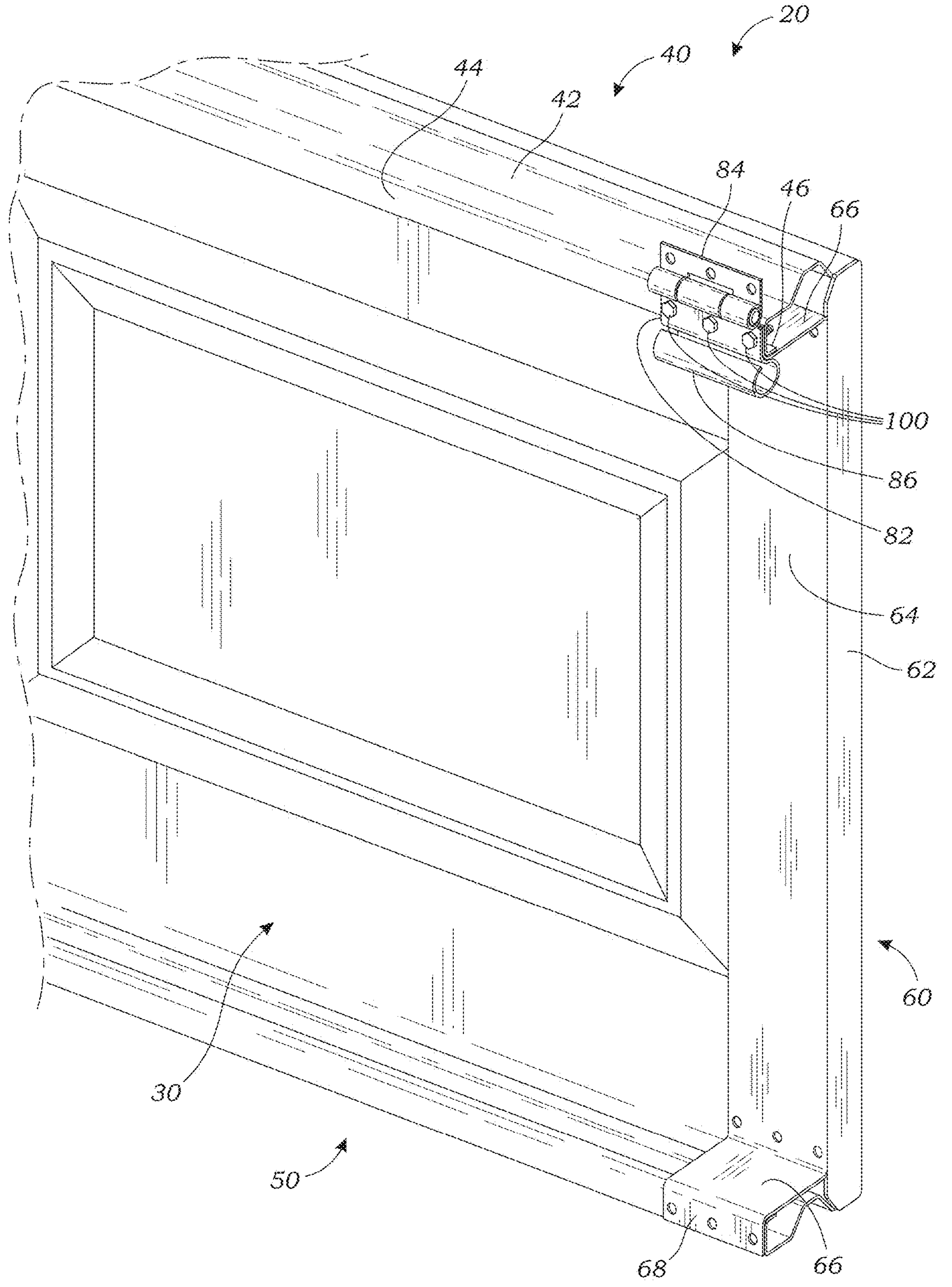
FIG. 12 is a further partial rear perspective view thereof having a second exemplary low-profile hinge installed thereon, in accordance with at least one embodiment.
Figure 13:
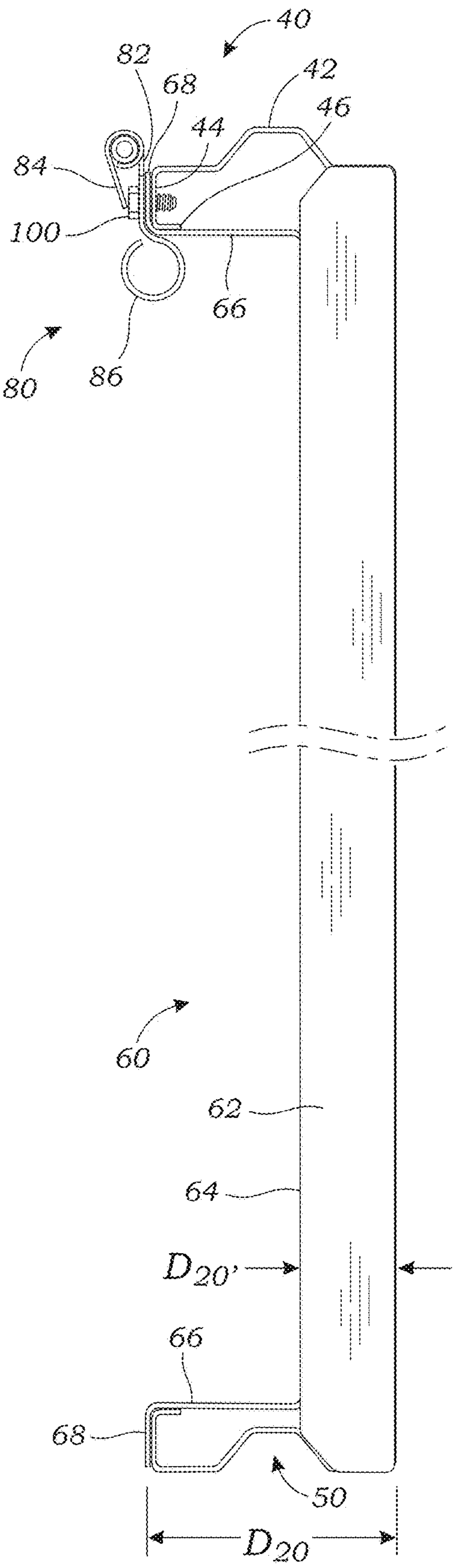
FIG. 13 is an enlarged end view thereof.
Figure 14:
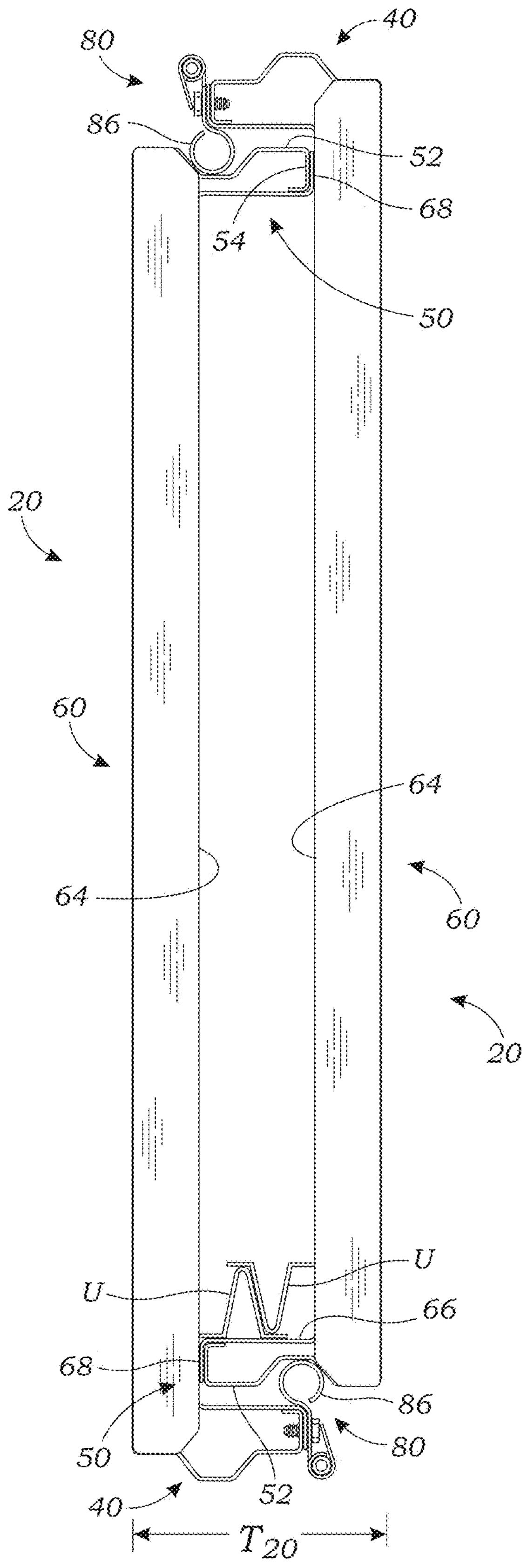
FIG. 14 is a reduced-scale end view of two sections thereof stacked together in nesting relationship.

Referring finally to FIGS. 12-14, there are shown rear perspective and end views of the exemplary door section 20 of FIGS. 5-8 now with a second exemplary low-profile hinge 80 installed along or at the top rail 40 again here on an end stile 60 but equally applicable to any center stile 70. Such hinge 80 once more generally comprises pivotally coupled first and second hinge plates 82, 84 for hingeably joining adjacent door sections 20 during door assembly and a roller support 86. Here in the alternate second exemplary low-profile hinge 80, the roller support 86 is formed directly on the first hinge plate 82 opposite the second hinge plate 84, thus positioning the roller support 86 just below the first hinge plate 82 as shown. Those skilled in the art will appreciate that here for the alternate exemplary hinge 80 the first hinge plate 82 and the roller support 86 may thus be formed out of a single piece of steel or other metal employing any appropriate material and method of manufacture now known or later developed, with only the second hinge plate 84 still being separately formed and hingeably coupled to the first hinge plate 82. Once more, the resulting configuration of the hinge 80 thus sets the depth or spatial location of the roller support 86 and thus any roller (not shown) relative to the door section 20 accordingly, again in any appropriate manner suitable to the context in terms of positioning any such roller support 86 and thus roller relative to any track (not shown) in which the finished door will operate. Here, fasteners 100 such as hex-head machine screws are shown as installing the hinge 80 as through the first hinge plate 82 into both the end stile flange 68 and the top rail leg 44. It will again be appreciated that any such fasteners 100 in terms of type and location, whether now known or later developed, as assembling such components in forming the finished pan overhead garage door section 20 according to aspects of the present invention may be employed. As shown in FIG. 14, two door sections 20 having the exemplary hinges 80 of FIGS. 12 and 13 mounted on the end and center stiles 60, 70 along or at the top rail 40 of each may again be stacked together in an inverted nesting arrangement wherein the bottom rail 50 of one door section 20 is seated adjacent to the hinge 80 at the top rail 40 of the other door section 20 specifically here with the hinge roller support 86 of one door section 20 abutting the bottom rail body 52 of the other inverted door section 20 and with the end and center stile flanges 68, 78 thereof adjacent the bottom rail leg 54 abutting the end or center stile face 64, 74 of the first door section 20 as shown. The resulting overall thickness $T_{20}$ of the two nested door sections 20 with the alternative hinge 80 that allows for abutting engagement between effectively the bottom rail 50 of one door section 20 with the recessed stile face 64, 74 of the other door section, again even with pre-installed hinges 80 that once more are positioned in such staggered nesting outside of the other door section 20 so as not to interfere therewith, is thus again considerably less than when two conventional door sections S2, S3 each having a full-profile thickness or depth D are stacked together in abutting relationship that again results in a stack height or overall thickness T of the two door sections S2, S3 of four inches (4 in.) (FIG. 4) or even slightly less than the first exemplary door sections 20 and hinges 80 of FIGS. 9-11 that resulted in a nested stack height or overall thickness $T_{20}$ of nominally three inches (3 in.). By comparison here, even with the nominal full-profile thickness or depth $D_{20}$ of the exemplary door sections 20 according to aspects of the present invention again also being two inches (2 in.) and with the low-profile end and center stiles 60, 70 setting a reduced depth $D_{20'}$ for each door section 20 between its top and bottom rails 40, 50 such that again the bottom rail 50 of one door section 20 seats adjacent to the offset or inset end or center stile face 64, 74 of the other door section 20, the result is a total stack height or thickness $T_{20}$ in this example of approximately two and three-quarter inches (2.75 in.), essentially due to the bottom rail 50 of one door section 20 seating directly against the recessed stile faces 64, 74 of the other door section 20 instead of on the head of the hinge fastener 100, which translates to a thirty-one percent (31%) reduction in stack height versus the conventional two-inch pan door stack as again shown in FIG. 4. As also shown in FIG. 14, even with the sections 20 nested slightly closer together, there is sufficient room along the full length of the sections 20 and atop or between the low-profile stiles 60, 70 for longer door hardware or hardware that is as long (or wide when installed) as the door sections 20 themselves are wide to also be stored between the nested sections 20, such as shown for a pair of struts U. It will be appreciated once more that other relatively long door hardware such as drive tubes, door tracks, and trim pieces (not shown) may similarly be stored between nested door sections 20 as even resting on or being attached to the low-profile stiles 60, 70, such as specifically on the respective stile faces 64, 74, and may again be accessed (inserted or removed) even with the door sections 20 nested and thus regardless it should be appreciated that the particular arrangement shown of the exemplary struts U is illustrative and non-limiting.

As noted previously, it is preferable that complete garage doors are packaged or bundled together for storage and transport for ease of handling and to eliminate or reduce the risk of parts being separated so that a complete door with all needed hardware can be stored and transported whether in bulk or individually to a job site. The typical residential garage door, whether single-car or two-car in width, typically is four door sections in height. As such, four door sections plus all related hardware are to be packaged or bundled together as a complete stacked four door section bundle. For the conventional pan garage door G with nominal two-inch thickness or depth D as shown in FIGS. 1-4 and described above, it follows that with the two-section stack height or thickness T nominally of four inches (4 in.), the four unassembled door sections S1, S2, S3, S4 would thus have a nominal stack height of about eight inches (8 in.), or more precisely about eight-and-a-half inches (8.5 in.) when accounting for the corrugated box or cardboard or other packaging materials around the sections S1, S2, S3, S4. In addition, a further flat box including all related hardware such as strut(s), drive tube, door tracks, trim pieces, hinges, rollers, brackets, screws and other fasteners, etc. having a nominal thickness of three inches (3 in.) is also to be included or bundled with the door sections, bringing the total effective stack height for a single conventional four-section two-inch pan garage door to approximately eleven-and-a-half inches (11.5 in.). By comparison, in a garage door employing pan sections 20 with low-profile stiles 60, 70 and hinges 80 according to aspects of the present invention, where as noted above the nested stack height or thickness $T_{20}$ of two sections is in the range of two-and-three quarter inches to three inches (2.75-3 in.), or roughly in the range of sixty to eighty percent (60-80%) of the conventional two-door section stack height of four inches (4 in.), depending on the hinge 80 configuration and other factors, and that including pre-installing the hinges 80 and storing all needed door hardware between the nested sections 20, even accounting for one-quarter inch (0.25 in.) of corrugated box or cardboard or other packaging materials around each pair of sections 20, the result is a stack height for four such nested sections 20 of approximately six inches to six-and-a-half inches (6-6.5 in.), or nearly half that of the conventional two-inch pan door. Such reduced overall package or bundle size for a single unassembled garage door will clearly be beneficial in storage and transport as taking up so much less space as well as in handling, it being appreciated that a six- to six-and-a-half inches-tall (6-6.5 in.) bundle is much easier to grasp and manipulate than an eleven-and-a-half inches-tall (11.5 in.) bundle. And it will be further appreciated that when it comes to bulk shipping, this size difference has a huge effect. The typical internal dimensions of a tractor trailer are nominally fifty-three feet (53 ft.) in length, eight feet (8 ft.) or ninety-six inches (96 in.) in width, and nine feet (9 ft.) or one-hundred-eight inches (108 in.) in height, though the usable or safe-loading height is generally about one hundred inches (100 in.). Accordingly, with the four sections of the conventional two-inch two-car pan door having a nominal overall length (or width as installed) of sixteen feet (16 ft.) and a nominal width (or height as installed) of twenty-one inches (21 in.), it follows that in such a standard trailer, three rows deep (3×16 ft.=48 ft.<53 ft.) and four rows across (4×21 in.=84 in.<96 in.) of stacked sections or a total of twelve stacks may be placed within the trailer as a "truckload." Looking then at the height available within the trailer of about 100 inches (100 in.), it follows that with the conventional pan door requiring approximately eleven-and-a-half inches (11.5 in.) per door as stacked unassembled, at most there can be nine (9) doors per stack (9×11.5 in.=103.5 in.), which translates to one-hundred-eight (108) doors (9×12) per truckload, or more conservatively with eight (8) doors per stack only ninety-six (96) doors per truckload. Again, by comparison, doors comprising door sections 20 according to aspects of the present invention that can be bundled in complete stack heights of approximately six to six-and-a-half inches (6-6.5 in.) results in either fifteen (15) (15×6.5 in.=97.5 in.) or sixteen (16) (16×6 in.=96 in.) doors per stack or one-hundred-eighty (15×12=180) to one-hundred-ninety-two (16×12=192) doors per truckload, a huge increase or basically up to about double the number of conventional two-inch pan doors (67-100% increase), which translates to immense increases in storage and shipping efficiency or reduction in storage and shipping costs per garage door essentially. That is, the amount of space required not just in shipping but for a dealer to store product can be reduced by up to fifty percent (50%), and noting that pan doors are currently the cheapest door in the industry yet they require as much space to ship and store as do much more expensive doors, the space savings benefit of such door or door sections 20 according to aspects of the present invention is again significant. And it is noted that even accounting for the staggered nesting of door sections 20 according to aspect of the present invention such that while the nominal width (or height when installed) of each door section is again twenty-one inches (21 in.) the effective width of two staggered nested sections 20 is approximately twenty-three inches (23 in.), such is of no consequence in terms of still being able to have four stacks across the typical trailer (4×23 in.=92 in.<96 in.). It is also noted that even in the case of a sandwich-style insulated door or door section having a nominal thickness of one inch (1 in.) not including any integral struts or other hardware such as the Model 9100 door sold by Wayne-Dalton and packaged as a complete door with four sections and all related hardware under the "TotalPack" brand name, which is thus a relatively higher cost door, such package height or thickness is approximately seven-and-two-thirds inches (7⅔ in. or 7.67 in.), which translates to twelve (12) (12×7.67 in.=92 in.) or at most thirteen (13) (13×7.67 in.=100 in.) doors per stack and thus one-hundred-forty-four (144) to one-hundred-fifty-six (156) doors per truckload, still less than what is possible with the relatively cheaper pan doors with door sections 20 according to aspects of the present invention, representing an across-the-board improvement and cost savings based on the present invention. Those skilled in the art will appreciate that by making the garage door sections even thinner in theory more such door sections and thus complete unassembled overhead garage doors may be stored in such a typical tractor trailer truckload, but such doors may then not meet strength, cycle or durability, or other performance requirements. Accordingly, an advantage of the door section 20 according to aspects of the present invention with its low-profile end and center stiles 60, 70 and optional low-profile pre-installed hinges 80 is that such efficient nested stacking of door sections 20 even with door hardware stored therebetween and the resulting number of complete unassembled pan overhead garage door bundles per truckload is achieved while still employing a structurally sufficient nominally two-inch deep pan door configuration, which has never before been done. It will be further appreciated that similar benefits can be realized for other nominal pan door thicknesses or depths employing the same or similar low-profile end and center stiles 60, 70 and optional low-profile pre-installed hinges 80 according to aspects of the present invention.

In forming any such pan overhead garage door section 20 according to aspects of the present invention, it will be appreciated that any appropriate materials and methods of construction now known or later developed may be employed, including but not limited to sheet steel of various gauge thicknesses, any such components being fabricated or formed as through rolling, stamping, forming, or any other such technique now known or later developed. Relatedly, any features or separately installed hardware such as the stiles 60, 70 and hinges 80 of any such door sections 20 may be secured in any appropriate secondary operation employing any assembly technique now known or later developed, including but not limited to clinching, fastening, bonding, welding, press-fitting, snapping, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting. Moreover, a pan door section 20 according to aspects of the present invention may be non-insulated as shown or may be insulated, in whole or in part, with such insulation (not shown) being of any type and formed or applied employing any appropriate method now known or later developed, in any case not being thicker than the intermediate depth $D_{20}$, between the rails 40, 50 set by the low-profile end and center stiles 60, 70. That is, in any such configuration of an overhead garage door section 20 according to aspects of the present invention, it will be appreciated that any insulation backing or rear panel or sheet (not shown) would be formed and contained effectively within the profile of the door section 20 such as shown in FIG. 8 between the door face 30 and the low-profile stiles 60, 70, and specifically the faces 64, 74 thereof.

Aspects of the present specification may also be described as the following numbered embodiments:

1. A pan overhead garage door section, comprising: a door section face having a longitudinal face top edge and an opposite longitudinal face bottom edge; a top rail integral with the door section face formed longitudinally therealong, the top rail comprising a top rail body extending rearwardly from the face top edge perpendicular to the door section face and further comprising a top rail leg extending downwardly from the top rail body offset from and parallel to the door section face; and a bottom rail integral with the door section face formed longitudinally therealong opposite of the top rail, the bottom rail comprising a bottom rail body extending rearwardly from the face bottom edge perpendicular to the door section face and further comprising a bottom rail leg extending upwardly from the bottom rail body offset from and parallel to the door section face, wherein the perpendicular distance along the door section face between the face top edge and the opposite face bottom edge defines a nominal door section height, wherein the opposite top and bottom rail legs are formed in a common plane and the perpendicular distance between the door section face and the plane of the top and bottom rail legs defines a nominal door section depth, and wherein the nominal door section height defined by the door section face and the nominal door section depth defined by the door section face and the opposite top and bottom rails together define a door section full-profile; the pan overhead garage door section further comprising: an end stile installed at each end of the door section face spanning between the opposite top and bottom rails, the end stile comprising at least one end stile side wall that is perpendicular to the door section face and an end stile face that is integral with and perpendicular to the at least one end stile side wall offset from and parallel to the door section face, the end stile face being offset from the plane of the top and bottom rail legs toward the door section face entirely between the opposite top and bottom rails; and a center stile installed at an intermediate location along the door section face spanning between the opposite top and bottom rails, the center stile comprising at least one center stile side wall that is perpendicular to the door section face and a center stile face that is integral with and perpendicular to the at least one center stile side wall offset from and parallel to the door section face, the center stile face being offset from the plane of the top and bottom rail legs toward the door section face entirely between the opposite top and bottom rails, wherein the perpendicular distance between the door section face and the offset end and center stile faces defines a reduced door section depth between the opposite top and bottom rails, the reduced door section depth being less than the nominal door section depth and defining a door section low-profile between the opposite top and bottom rails that is smaller than the door section full-profile, thereby allowing for nested stacking of two pan overhead garage door sections together and accessible storage of door hardware between such nested pan overhead garage door sections.

2. The pan overhead garage door section of embodiment 1, wherein the reduced door section depth is in the range of twenty-five to fifty percent of the nominal door section depth.

3. The pan overhead garage door section of embodiment 1 or embodiment 2, wherein: the nominal door section depth is two inches; and the reduced door section depth is in the range of one-half inch to one inch.

4. The pan overhead garage door section of any of embodiments 1-3, wherein the reduced door section depth is in the range of five-eighths inch to seven-eighths inch.

5. The pan overhead garage door section of any of embodiments 1-4, wherein the reduced door section depth is in the range of eleven-sixteenths inch to thirteen-sixteenths inch.

6. The pan overhead garage door section of any of embodiments 1-5, wherein the reduced door section depth is in the range of 0.79 in. to 0.89 in.

7. The pan overhead garage door section of any of embodiments 1-6, wherein: each end stile further comprises opposite end stile risers integral with and extending rearwardly and perpendicularly from opposite top and bottom ends of the end stile face and terminating in opposite upwardly and downwardly extending end stile flanges, each end stile thus configured such that upon installation of the end stile on the door section face the end stile flanges lie along at least a portion of the respective top and bottom rail legs, whereby each end stile is secured by fastening each end stile flange to the respective top and bottom rail leg; and each center stile further comprises opposite center stile risers integral with and extending rearwardly and perpendicularly from opposite top and bottom ends of the center stile face and terminating in opposite upwardly and downwardly extending center stile flanges, each center stile thus configured such that upon installation of the center stile on the door section face the center stile flanges lie along at least a portion of the respective top and bottom rail legs, whereby each center stile is secured by fastening each center stile flange to the respective top and bottom rail leg.

8. The pan overhead garage door section of embodiment 7, wherein: the top rail leg terminates in a forwardly extending top rail foot that is thus perpendicular to both the top rail leg and the door section face and is thus parallel to and offset from the top rail body; the bottom rail leg terminates in a forwardly extending bottom rail foot that is thus perpendicular to both the bottom rail leg and the door section face and is thus parallel to and offset from the bottom rail body; each end stile is configured such that upon installation of the end stile on the door section face at least a portion of each end stile riser lies along the respective top and bottom rail foot; and each center stile is configured such that upon installation of the center stile on the door section face at least a portion of each center stile riser lies along the respective top and bottom rail foot.

9. The pan overhead garage door section of any of embodiments 1-8, further comprising a hinge operably installed on each of the end and center stiles, the hinge comprising a first hinge plate, a second hinge plate hingeably coupled to the first hinge plate, and a roller support.

10. The pan overhead garage door section of embodiment 9, wherein each first hinge plate is mounted on the respective end and center stile flanges.

11. The pan overhead garage door section of embodiment 9 or embodiment 10, wherein the roller support is formed on the first hinge plate opposite the second hinge plate.

12. The pan overhead garage door section of any of embodiments 9-11, wherein a fastener passes through the first hinge plate, the respective end and center stile flange, and the top rail leg in installing each hinge.

13. The pan overhead garage door section of embodiment 9, wherein opposite of the second hinge plate a forwardly-extending riser plate is integral with and perpendicular to the first hinge plate that is mounted on and thus parallel to both the respective end and center stile flange and the top rail leg, the riser plate thus being parallel to the top rail body and the respective end and center stile riser and perpendicular to the door section face, the riser plate terminating forwardly at the respective end and center stile face in an integral perpendicular downwardly-extending mounting plate that is thus parallel and adjacent to the respective end and center stile face, the mounting plate then terminating in an integral perpendicular rearwardly-extending roller support plate that is thus parallel to and offset from the riser plate, the roller support being formed on the roller support plate opposite of the mounting plate, thus positioning the roller support spaced below and offset from the first hinge plate.

14. The pan overhead garage door section of embodiment 13, wherein a fastener passes through the mounting plate and the respective end and center stile face in installing each hinge.

15. A method of manufacturing the pan overhead garage door section of any of embodiments 1-14, the method comprising the steps of: forming the door section face, the top rail, and the bottom rail from a single piece of material; forming two end stiles each having the at least one end stile side wall and the integral end stile face perpendicular to the at least one end stile side wall; forming the center stile having the at least one center stile side wall and the integral center stile face perpendicular to the at least one center stile side wall; installing one of the end stiles at each end of the door section face spanning between the opposite top and bottom rails such that the at least one end stile side wall is perpendicular to the door section face and the end stile face is offset from and parallel to the door section face, the end stile face being offset from the plane of the top and bottom rail legs toward the door section face entirely between the opposite top and bottom rails; and installing the center stile at the intermediate location along the door section face spanning between the opposite top and bottom rails such that the at least one center stile side wall is perpendicular to the door section face and the center stile face is offset from and parallel to the door section face, the center stile face being offset from the plane of the top and bottom rail legs toward the door section face entirely between the opposite top and bottom rails.

16. The method of embodiment 15, wherein: the step of forming the two end stiles further comprises forming each end stile with opposite end stile risers integral with and extending rearwardly and perpendicularly from opposite top and bottom ends of the end stile face and forming the end stile risers with opposite upwardly and downwardly extending end stile flanges opposite of the end stile face such that the end stile flanges are offset from the end stile face; the step of forming the center stile further comprises forming opposite center stile risers integral with and extending rearwardly and perpendicularly from opposite top and bottom ends of the center stile face and forming the center stile risers with opposite upwardly and downwardly extending center stile flanges opposite of the center stile face such that the center stile flanges are offset from the center stile face; the step of installing one of the end stiles at each end of the door section face further comprises positioning the end stile flanges along at least a portion of the respective top and bottom rail legs and fastening each end stile flange to the respective top and bottom rail leg; and the step of installing the center stile at the intermediate location along the door section face further comprises positioning the center stile flanges along at least a portion of the respective top and bottom rail legs and fastening each center stile flange to the respective top and bottom rail leg.

17. The method of embodiment 16, further comprising the steps of: forming a plurality of the hinges as for each hinge forming a first hinge plate, a second hinge plate hingeably coupled to the first hinge plate, and a roller support; and operably installing one hinge on each of the end and center stiles at the top rail.

18. The method of embodiment 17, wherein the step of operably installing a hinge on each of the end and center stiles comprises mounting each first hinge plate on the respective end and center stile flange such that the first hinge plate is parallel to both the respective end and center stile flange and the top rail leg.

19. The method of embodiment 18, wherein the step of mounting each first hinge plate on the respective end and center stile flange comprises installing at least one fastener through the first hinge plate, the respective end and center stile flange, and the top rail leg.

20. The method of embodiment 17, wherein the step of forming a plurality of the hinges further comprises as for each hinge forming a forwardly-extending riser plate integral with and perpendicular to the first hinge plate opposite of the second hinge plate, forming a downwardly-extending mounting plate integral with and perpendicular to the riser plate opposite of the first hinge plate, forming a rearwardly-extending roller support plate integral with and perpendicular to the mounting plate opposite of the riser plate, the roller support plate thus being parallel to and offset from the riser plate, and forming the roller support on the roller support plate opposite of the mounting plate, thus positioning the roller support spaced below and offset from the first hinge plate.

21. The method of embodiment 20, wherein the step of operably installing a hinge on each of the end and center stiles further comprises mounting each mounting plate on the respective end and center stile face such that the riser plate is parallel to the top rail body and the respective end and center stile riser and perpendicular to the door section face and the mounting plate is parallel and adjacent to the respective end and center stile face.

22. The method of embodiment 21, wherein the step of mounting each mounting plate on the respective end and center stile face comprises installing at least one fastener through the mounting plate and the respective end and center stile face.

23. A method of using the pan overhead garage door section of any of embodiments 1-14, the method comprising the step of stacking two such pan overhead garage door sections together as by inverting and nesting the respective pan overhead garage door sections relative to each other such that the top rail of a first pan overhead garage door section is alongside the bottom rail of a second pan overhead garage door section and the top rail of the second pan overhead garage door section is alongside the bottom rail of the first pan overhead garage door section, with each bottom rail leg thereby being proximate to the respective end and center stile face, the stacked two pan overhead garage door sections defining a nested section thickness that is less than a conventional stacked section thickness.

24. The method of embodiment 23, wherein the nested section thickness is in the range of sixty to eighty percent of the conventional stacked section thickness.

25. The method of embodiment 23 or embodiment 24, wherein: the conventional stacked section thickness is four inches; and the nested section thickness is in the range of two-and-three-quarter inches to three inches.

26. The method of any of embodiments 23-25, wherein the step of inverting and nesting the respective pan overhead garage door sections relative to each other comprises positioning an end and center stile flange of the respective end and center stiles that is adjacent to the bottom rail leg of the second pan overhead garage door section adjacent to the respective end and center stile face of the first pan overhead garage door section and positioning an end and center stile flange of the respective end and center stiles that is adjacent to the bottom rail leg of the first pan overhead garage door section adjacent to the respective end and center stile face of the second pan overhead garage door section.

27. The method of embodiment 26, wherein the step of inverting and nesting the respective pan overhead garage door sections relative to each other further comprises positioning a roller support formed on a first hinge plate of a hinge operably installed on the top rail of the first pan overhead garage door section proximate to the bottom rail body of the second pan overhead garage door section and positioning the roller support formed on the first hinge plate of the hinge operably installed on the top rail of the second pan overhead garage door section proximate to the bottom rail body of the first pan overhead garage door section.

28. The method of any of embodiments 23-25, wherein the step of inverting and nesting the respective pan overhead garage door sections relative to each other comprises positioning the bottom rail of the second pan overhead garage door section between a riser plate and an opposite roller support plate of a hinge operably installed on each of the end and center stiles of the first pan overhead garage door section such that an end and center stile flange of the respective end and center stiles that is adjacent to the bottom rail leg of the second pan overhead garage door section is proximate to the respective end and center stile face of the first pan overhead garage door section and positioning the bottom rail of the first pan overhead garage door section between a riser plate and an opposite roller support plate of a hinge operably installed on each of the end and center stiles of the second pan overhead garage door section such that an end and center stile flange of the respective end and center stiles that is adjacent to the bottom rail leg of the first pan overhead garage door section is proximate to the respective end and center stile face of the second pan overhead garage door section.

29. The method of embodiment 28, wherein the step of inverting and nesting the respective pan overhead garage door sections relative to each other further comprises positioning a roller support formed on the roller support plate of each hinge operably installed on the first pan overhead garage door section adjacent to the respective end and center stile face of the second pan overhead garage door section and positioning a roller support formed on the roller support plate of each hinge operably installed on the second pan overhead garage door section adjacent to the respective end and center stile face of the first pan overhead garage door section.

30. The method of any of embodiments 23-29, further comprising the step of removably storing a door hardware box between the stacked two pan overhead garage door sections.

31. The method of any of embodiments 23-30, further comprising the step of removably storing an elongate door hardware component between the stacked two pan overhead garage door sections, the elongate door hardware component being as long as the pan overhead garage door sections are wide.

32. The method of any of embodiments 23-31, further comprising the step of bundling two nested stacks of the stacked two pan overhead garage door sections to form a four pan overhead garage door section bundle.

33. The method of embodiment 32, wherein at least one of the two stacked two pan overhead garage door sections comprises door hardware stored between the stacked two pan overhead garage door sections, whereby the four pan overhead garage door section bundle comprises a complete unassembled overhead garage door.

34. The method of embodiment 33, wherein the four pan overhead garage door section bundle defines a stack height in the range of six inches to six-and-a-half inches despite the nominal depth of each pan overhead garage door section being two inches.

35. The method of embodiment 34, further comprising the step of stacking at least one-hundred-eighty complete four-section unassembled overhead garage door bundles in a conventional tractor trailer having internal dimensions of nominally fifty-three feet in length, eight feet in width, and nine feet in height.

In closing, regarding the exemplary embodiments of the present invention as shown and described herein, it will be appreciated that a pan overhead garage door section and methods of its manufacture and use are disclosed and configured for improved storage, shipping, and handling of unassembled complete pan overhead garage doors. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc. —for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor (s) believe that the claimed subject matter is the invention.

What is claimed is:

1. A pan overhead garage door section, comprising:

a door section face having a longitudinal face top edge and an opposite longitudinal face bottom edge;

a top rail integral with the door section face formed longitudinally therealong, the top rail comprising a top rail body extending rearwardly from the face top edge perpendicular to the door section face and further comprising a top rail leg extending downwardly from the top rail body offset from and parallel to the door section face; and a bottom rail integral with the door section face formed longitudinally therealong opposite of the top rail, the bottom rail comprising a bottom rail body extending rearwardly from the face bottom edge perpendicular to the door section face and further comprising a bottom rail leg extending upwardly from the bottom rail body offset from and parallel to the door section face, wherein a perpendicular distance along the door section face between the face top edge and the opposite face bottom edge defines a nominal door section height, wherein the opposite top and bottom rail legs are formed in a common plane and a perpendicular distance between the door section face and the plane of the top and bottom rail legs defines a nominal door section depth, and wherein the nominal door section height defined by the door section face and the nominal door section depth defined by the door section face and the opposite top and bottom rails together define a door section full-profile;

the pan overhead garage door section further comprising:

an end stile installed at each end of the door section face spanning between the opposite top and bottom rails, the end stile comprising at least one end stile side wall that is perpendicular to the door section face and an end stile face that is integral with and perpendicular to the at least one end stile side wall offset from and parallel to the door section face, the end stile face being offset from the plane of the top and bottom rail legs toward the door section face entirely between the opposite top and bottom rails; and a center stile installed at an intermediate location along the door section face spanning between the opposite top and bottom rails, the center stile comprising at least one center stile side wall that is perpendicular to the door section face and a center stile face that is integral with and perpendicular to the at least one center stile side wall offset from and parallel to the door section face, the center stile face being offset from the plane of the top and bottom rail legs toward the door section face entirely between the opposite top and bottom rails, wherein a maximum perpendicular distance between the door section face and the offset end and center stile faces defines a reduced door section depth between the opposite top and bottom rails, the reduced door section depth being less than seventy-five percent of the nominal door section depth and defining a door section low-profile between the opposite top and bottom rails that is smaller than the door section full-profile, thereby allowing for nested stacking of two pan overhead garage door sections together and accessible storage of door hardware between such nested pan overhead garage door sections.

2. The pan overhead garage door section of claim 1, wherein the reduced door section depth is in the range of twenty-five to fifty percent of the nominal door section depth.

3. The pan overhead garage door section of claim 1, wherein:

the nominal door section depth is two inches; and the reduced door section depth is in the range of one-half inch to one inch.

4. The pan overhead garage door section of claim 1, wherein the reduced door section depth is in the range of 0.79 in. to 0.89 in.

5. The pan overhead garage door section of claim 1, wherein:

each end stile further comprises opposite end stile risers integral with and extending rearwardly and perpendicularly from opposite top and bottom ends of the end stile face and terminating in opposite upwardly and downwardly extending end stile flanges, each end stile thus configured such that upon installation of the end stile on the door section face the end stile flanges lie along at least a portion of the respective top and bottom rail legs, whereby each end stile is secured by fastening each end stile flange to the respective top and bottom rail leg; and each center stile further comprises opposite center stile risers integral with and extending rearwardly and perpendicularly from opposite top and bottom ends of the center stile face and terminating in opposite upwardly and downwardly extending center stile flanges, each center stile thus configured such that upon installation of the center stile on the door section face the center stile flanges lie along at least a portion of the respective top and bottom rail legs, whereby each center stile is secured by fastening each center stile flange to the respective top and bottom rail leg.

6. The pan overhead garage door section of claim 5, wherein:

the top rail leg terminates in a forwardly extending top rail foot that is thus perpendicular to both the top rail leg and the door section face and is thus parallel to and offset from the top rail body;

the bottom rail leg terminates in a forwardly extending bottom rail foot that is thus perpendicular to both the bottom rail leg and the door section face and is thus parallel to and offset from the bottom rail body;

each end stile is configured such that upon installation of the end stile on the door section face at least a portion of each end stile riser lies along the respective top and bottom rail foot; and each center stile is configured such that upon installation of the center stile on the door section face at least a portion of each center stile riser lies along the respective top and bottom rail foot.

7. The pan overhead garage door section of claim 1, further comprising a hinge operably installed on each of the end and center stiles, the hinge comprising a first hinge plate, a second hinge plate hingeably coupled to the first hinge plate, and a roller support.

8. The pan overhead garage door section of claim 7, wherein each first hinge plate is mounted on the respective end and center stile flanges.

9. The pan overhead garage door section of claim 8, wherein the roller support is formed on the first hinge plate opposite the second hinge plate.

10. The pan overhead garage door section of claim 7, wherein opposite of the second hinge plate a forwardly-extending riser plate is integral with and perpendicular to the first hinge plate that is mounted on and thus parallel to both the respective end and center stile flange and the top rail leg, the riser plate thus being parallel to the top rail body and the respective end and center stile riser and perpendicular to the door section face, the riser plate terminating forwardly at the respective end and center stile face in an integral perpendicular downwardly-extending mounting plate that is thus parallel and adjacent to the respective end and center stile face, the mounting plate then terminating in an integral perpendicular rearwardly-extending roller support plate that is thus parallel to and offset from the riser plate, the roller support being formed on the roller support plate opposite of the mounting plate, thus positioning the roller support spaced below and offset from the first hinge plate.

11. The pan overhead garage door section of claim 10, wherein a fastener passes through the mounting plate and the respective end and center stile face in installing each hinge.

12. A method of manufacturing the pan overhead garage door section of claim 1, the method comprising the steps of:

forming the door section face, the top rail, and the bottom rail from a single piece of material;

forming the end stiles each having the at least one end stile side wall and the integral end stile face perpendicular to the at least one end stile side wall;

forming the center stile having the at least one center stile side wall and the integral center stile face perpendicular to the at least one center stile side wall;

installing one of the end stiles at each end of the door section face spanning between the opposite top and bottom rails such that the at least one end stile side wall is perpendicular to the door section face and the end stile face is offset from and parallel to the door section face, the end stile face being offset from the plane of the top and bottom rail legs toward the door section face entirely between the opposite top and bottom rails; and installing the center stile at the intermediate location along the door section face spanning between the opposite top and bottom rails such that the at least one center stile side wall is perpendicular to the door section face and the center stile face is offset from and parallel to the door section face, the center stile face being offset from the plane of the top and bottom rail legs toward the door section face entirely between the opposite top and bottom rails.

13. The method of claim 12, wherein:

the step of forming the end stiles further comprises forming each end stile with opposite end stile risers integral with and extending rearwardly and perpendicularly from opposite top and bottom ends of the end stile face and forming the end stile risers with opposite upwardly and downwardly extending end stile flanges opposite of the end stile face such that the end stile flanges are offset from the end stile face;

the step of forming the center stile further comprises forming opposite center stile risers integral with and extending rearwardly and perpendicularly from opposite top and bottom ends of the center stile face and forming the center stile risers with opposite upwardly and downwardly extending center stile flanges opposite of the center stile face such that the center stile flanges are offset from the center stile face;

the step of installing one of the end stiles at each end of the door section face further comprises positioning the end stile flanges along at least a portion of the respective top and bottom rail legs and fastening each end stile flange to the respective top and bottom rail leg; and the step of installing the center stile at the intermediate location along the door section face further comprises positioning the center stile flanges along at least a portion of the respective top and bottom rail legs and fastening each center stile flange to the respective top and bottom rail leg.

14. The method of claim 13, further comprising the steps of:

forming a plurality of hinges as for each hinge forming a first hinge plate, a second hinge plate hingeably coupled to the first hinge plate, and a roller support; and operably installing one of the hinges on each of the end and center stiles at the top rail.

15. The method of claim 14, wherein the step of forming a plurality of hinges further comprises as for each hinge forming a forwardly-extending riser plate integral with and perpendicular to the first hinge plate opposite of the second hinge plate, forming a downwardly-extending mounting plate integral with and perpendicular to the riser plate opposite of the first hinge plate, forming a rearwardly-extending roller support plate integral with and perpendicular to the mounting plate opposite of the riser plate, the roller support plate thus being parallel to and offset from the riser plate, and forming the roller support on the roller support plate opposite of the mounting plate, thus positioning the roller support spaced below and offset from the first hinge plate.

16. A method of using the pan overhead garage door section of claim 1, the method comprising the step of stacking two such pan overhead garage door sections together as by inverting and nesting the respective pan overhead garage door sections relative to each other such that the top rail of a first pan overhead garage door section of the two pan overhead garage door sections is alongside the bottom rail of a second pan overhead garage door section of the two pan overhead garage door sections and the top rail of the second pan overhead garage door section is alongside the bottom rail of the first pan overhead garage door section, with each bottom rail leg thereby being proximate to the respective end and center stile face, the stacked two pan overhead garage door sections defining a nested section thickness that is less than a conventional stacked section thickness.

17. The method of claim 16, wherein the nested section thickness is in the range of sixty to eighty percent of the conventional stacked section thickness.

18. The method of claim 17, wherein:

the conventional stacked section thickness is four inches; and the nested section thickness is in the range of two-and-three-quarter inches to three inches.

19. The method of claim 16, wherein the step of inverting and nesting the respective pan overhead garage door sections relative to each other comprises positioning an end and center stile flange of the respective end and center stiles that is adjacent to the bottom rail leg of the second pan overhead garage door section adjacent to the respective end and center stile face of the first pan overhead garage door section and positioning an end and center stile flange of the respective end and center stiles that is adjacent to the bottom rail leg of the first pan overhead garage door section adjacent to the respective end and center stile face of the second pan overhead garage door section.

20. The method of claim 19, wherein the step of inverting and nesting the respective pan overhead garage door sections relative to each other further comprises positioning a roller support formed on a first hinge plate of a hinge operably installed on the top rail of the first pan overhead garage door section proximate to the bottom rail body of the second pan overhead garage door section and positioning the roller support formed on the first hinge plate of the hinge operably installed on the top rail of the second pan overhead garage door section proximate to the bottom rail body of the first pan overhead garage door section.

21. The method of claim 16, wherein the step of inverting and nesting the respective pan overhead garage door sections relative to each other comprises positioning the bottom rail of the second pan overhead garage door section between a riser plate and an opposite roller support plate of a hinge operably installed on each of the end and center stiles of the first pan overhead garage door section such that an end and center stile flange of the respective end and center stiles that is adjacent to the bottom rail leg of the second pan overhead garage door section is proximate to the respective end and center stile face of the first pan overhead garage door section and positioning the bottom rail of the first pan overhead garage door section between a riser plate and an opposite roller support plate of a hinge operably installed on each of the end and center stiles of the second pan overhead garage door section such that an end and center stile flange of the respective end and center stiles that is adjacent to the bottom rail leg of the first pan overhead garage door section is proximate to the respective end and center stile face of the second pan overhead garage door section.

22. The method of claim 21, wherein the step of inverting and nesting the respective pan overhead garage door sections relative to each other further comprises positioning a roller support formed on the roller support plate of each hinge operably installed on the first pan overhead garage door section adjacent to the respective end and center stile face of the second pan overhead garage door section and positioning a roller support formed on the roller support plate of each hinge operably installed on the second pan overhead garage door section adjacent to the respective end and center stile face of the first pan overhead garage door section.

23. The method of claim 16, further comprising the step of removably storing a door hardware box between the stacked two pan overhead garage door sections.

24. The method of claim 16, further comprising the step of removably storing an elongate door hardware component between the stacked two pan overhead garage door sections, the elongate door hardware component being as long as the pan overhead garage door sections are wide.

25. The method of claim 16, further comprising the step of bundling two nested stacks of the stacked two pan overhead garage door sections to form a four pan overhead garage door section bundle.

26. The method of claim 25, wherein at least one of the two stacked two pan overhead garage door sections comprises door hardware stored between the stacked two pan overhead garage door sections, whereby the four pan overhead garage door section bundle comprises a complete unassembled overhead garage door.

27. The method of claim 26, wherein the four pan overhead garage door section bundle defines a stack height in the range of six inches to six-and-a-half inches despite the nominal depth of each pan overhead garage door section being two inches.

28. The method of claim 27, further comprising the step of stacking at least one-hundred-eighty complete four-section unassembled overhead garage door bundles in a conventional tractor trailer having internal dimensions of nominally fifty-three feet in length, eight feet in width, and nine feet in height.

* * * * *